United States Patent [19]
Brems

[11] 4,249,652
[45] Feb. 10, 1981

[54] WORKPIECE VERTICAL CONVEYOR SYSTEM

[76] Inventor: John H. Brems, 32867 White Oaks Trail, Birmingham, Mich. 48010

[21] Appl. No.: 925,216

[22] Filed: Jul. 17, 1978

[51] Int. Cl.³ .................. B65H 37/00; B65H 47/26; B65H 17/12
[52] U.S. Cl. ........................ 198/796; 198/420; 198/472; 414/416; 414/110
[58] Field of Search ........... 198/796, 420, 422, 472, 198/482; 414/101, 78, 110, 416, 417

[56] References Cited

U.S. PATENT DOCUMENTS

| | | | |
|---|---|---|---|
| 1,794,331 | 2/1931 | Klyuer et al. | 198/796 |
| 3,403,794 | 10/1968 | Lopez | 198/482 |
| 3,770,107 | 11/1973 | Michelbach | 198/796 |

FOREIGN PATENT DOCUMENTS 293418 8/1916 Fed. Rep. of Germany ........... 198/472

Primary Examiner—Joseph E. Valenza
Assistant Examiner—Brian Bond
Attorney, Agent, or Firm—Barnes, Kisselle, Raisch & Choate

[57] ABSTRACT

An article carrier system in which articles are transferred between pallets and support means particularly useful in transfer systems where work articles are being processed in the way of machining and the like and being carried by conveyors, either on pallets or as a bare part, from station to station. An endless power driven, optionally reversible, conveyor is disposed vertically and has a plurality of pallet conveying buckets and a plurality of article conveying buckets arranged in a regular sequence on the conveyor. Adjacent the conveyor are transfer and support stations for removing and adding articles from and to the conveyor and for removing and adding pallets operating in response to the conveyor movement. The conveying and support members are interdigitally related so there can be a proper pass through for the individual functions. Thus, article buckets can pick up and deposit articles and pallet buckets can pick up and deposit pallets at respective support stations, and likewise pallets can be loaded and unloaded in various sequences.

18 Claims, 59 Drawing Figures

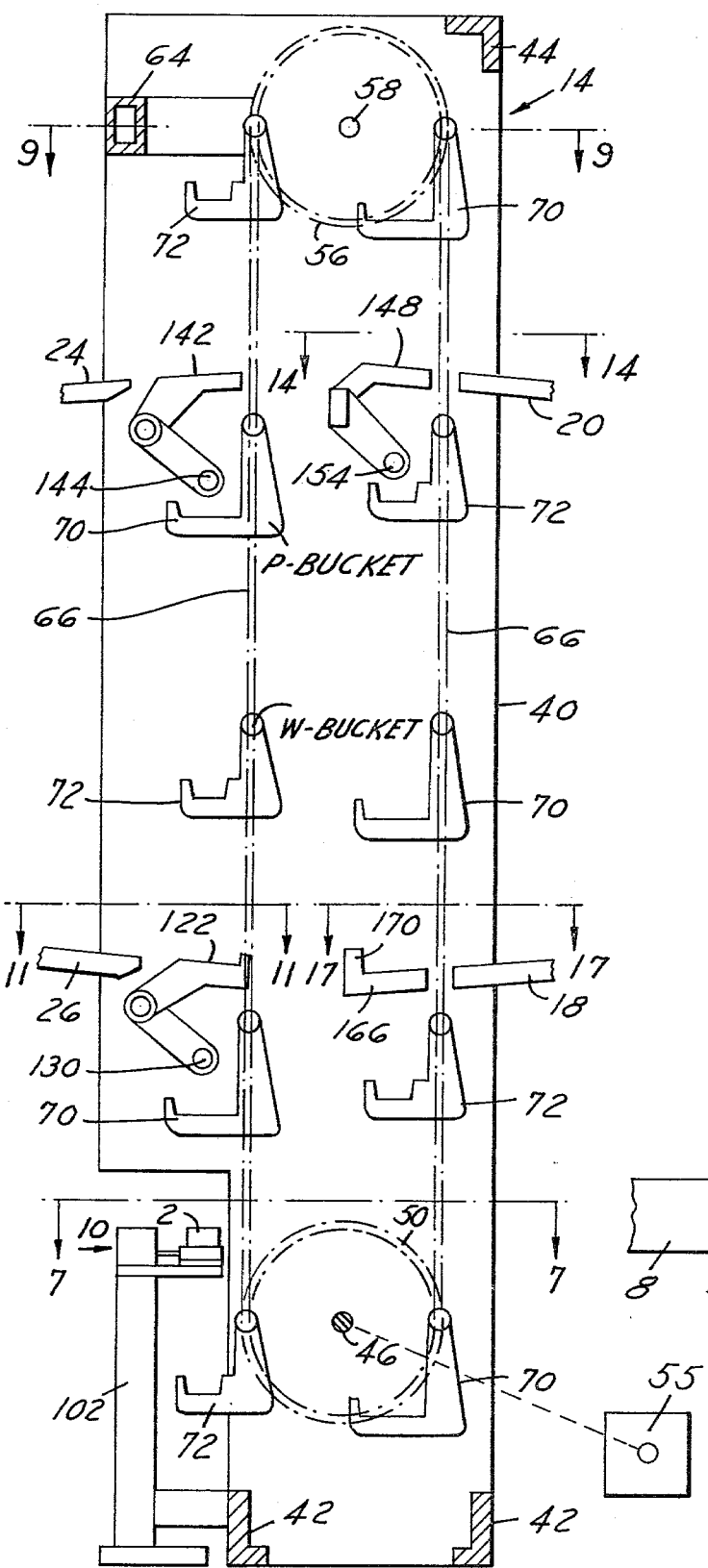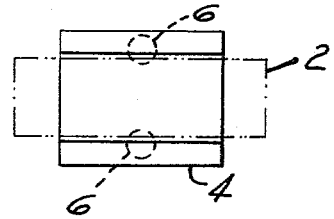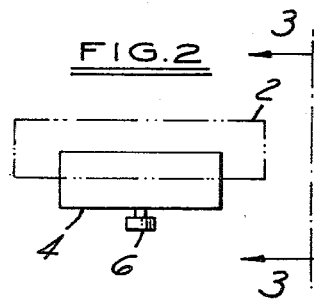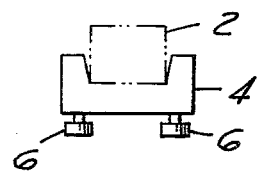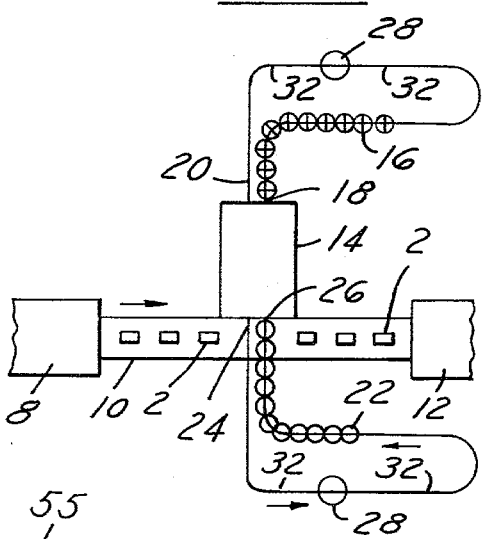

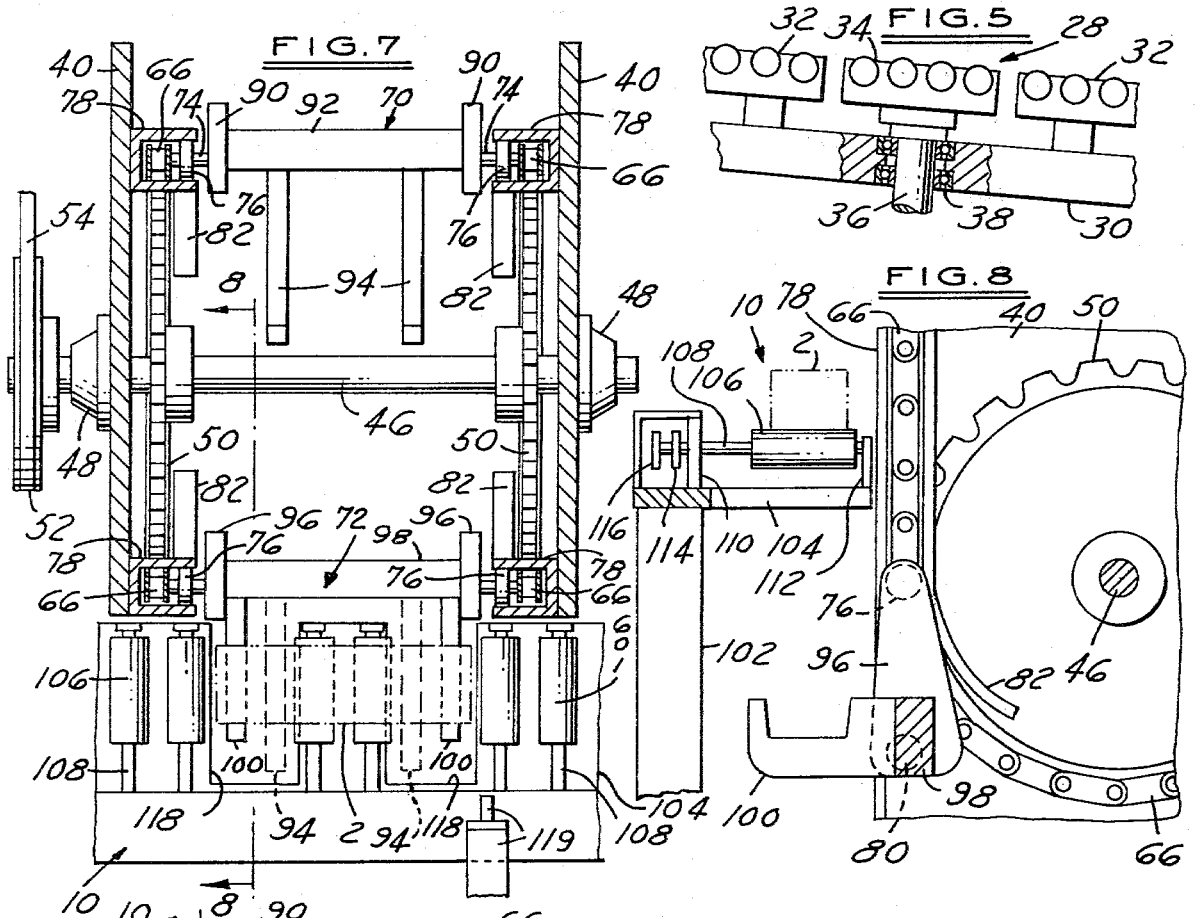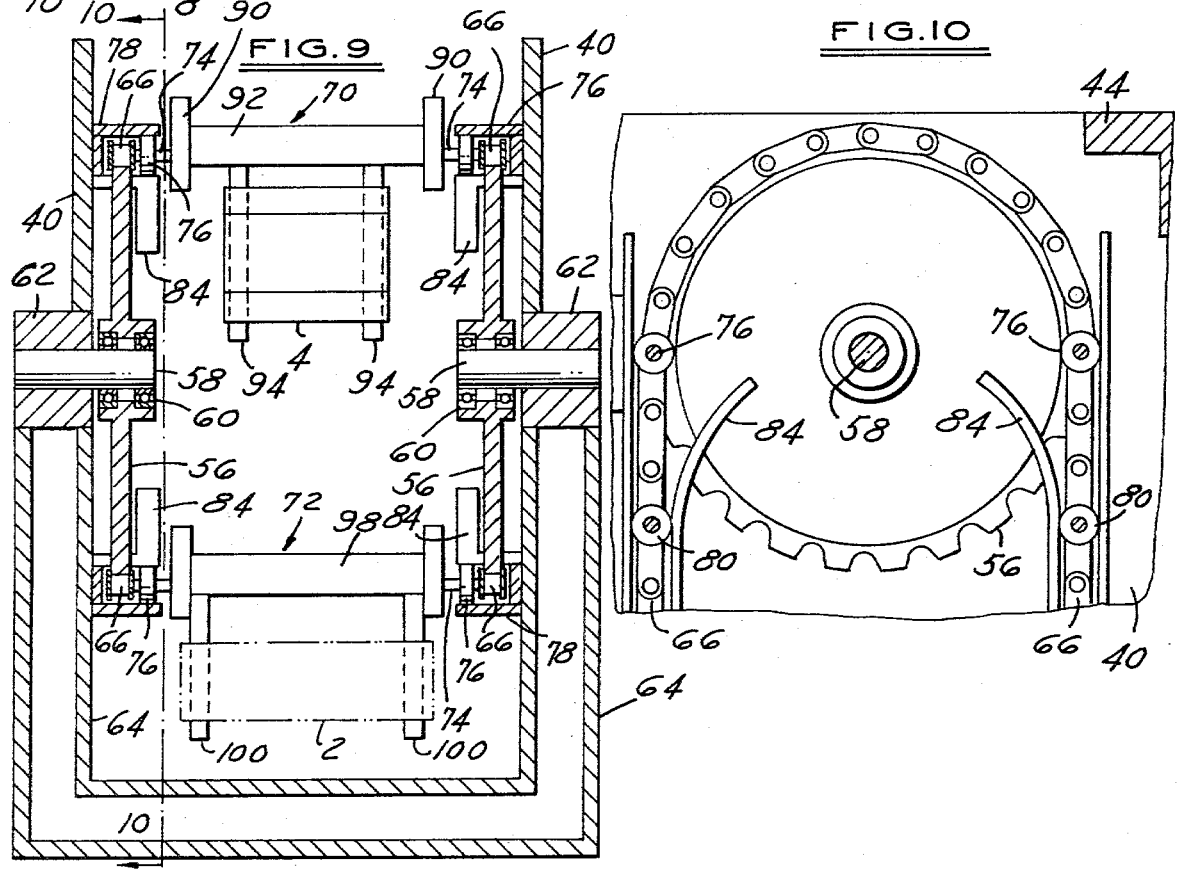

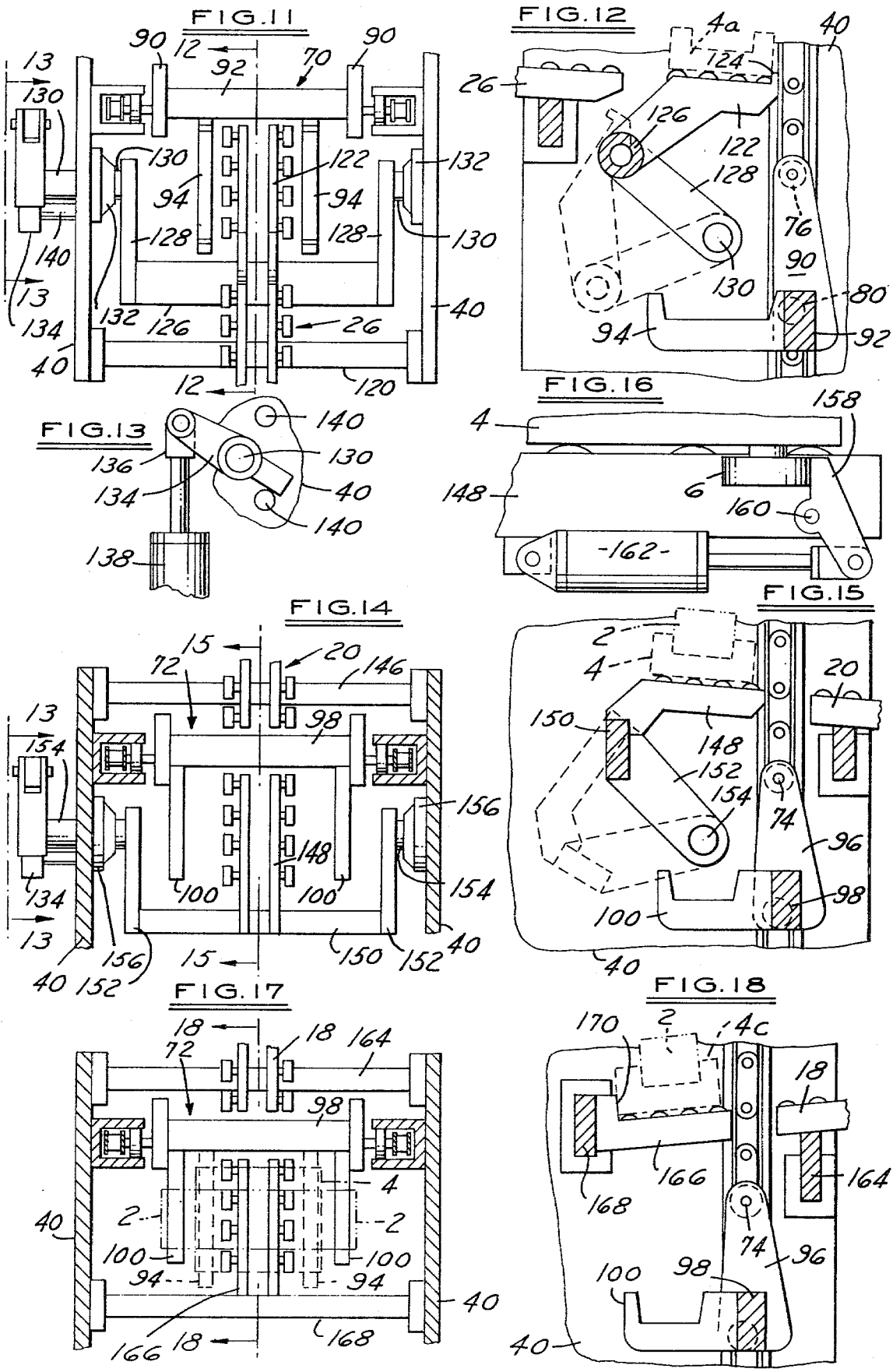

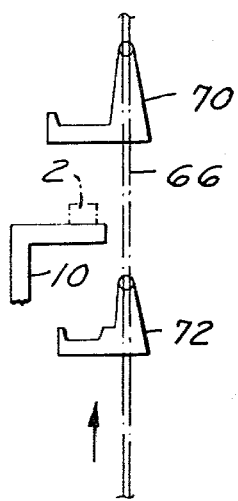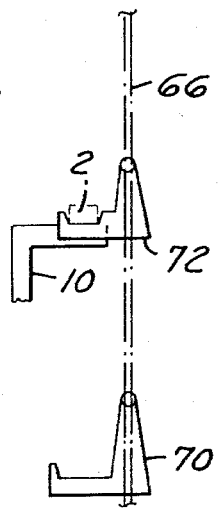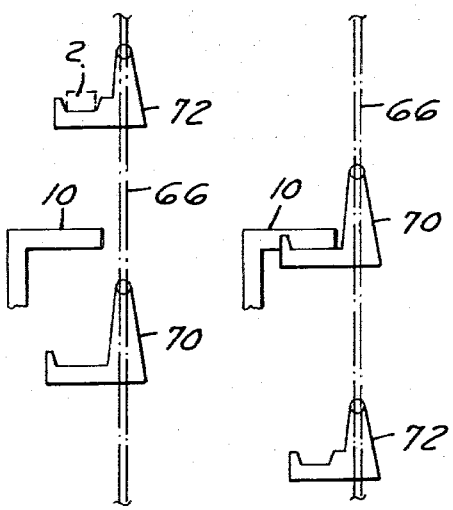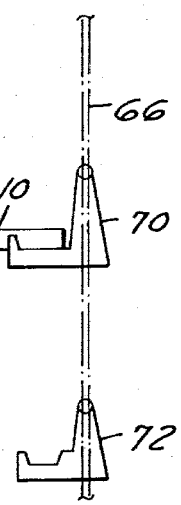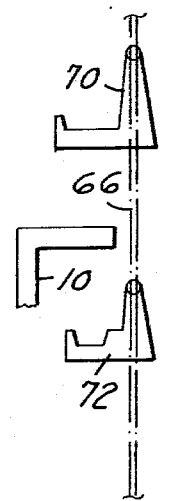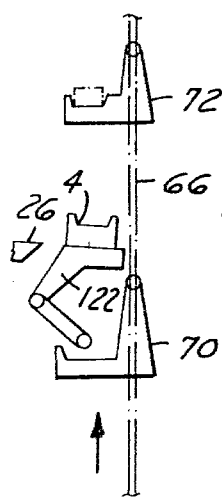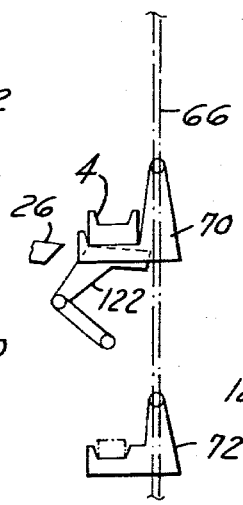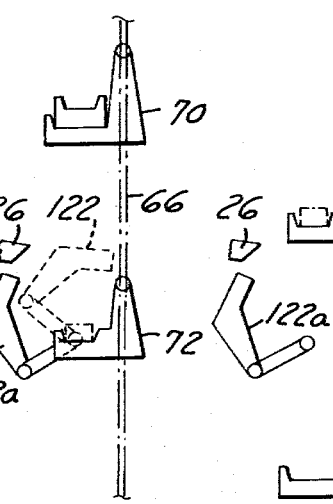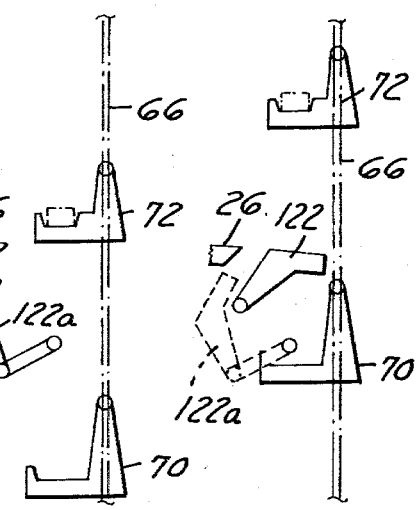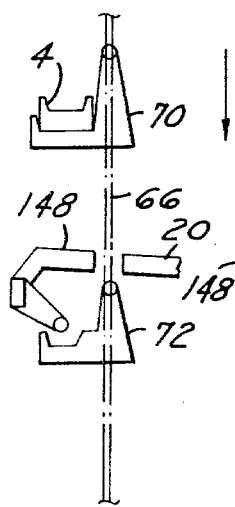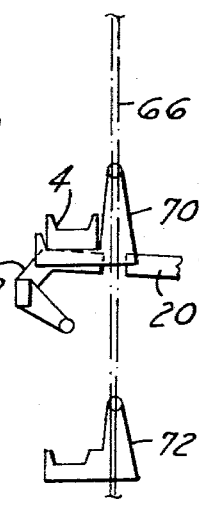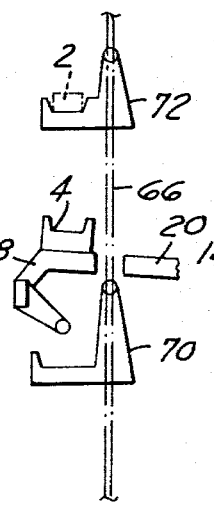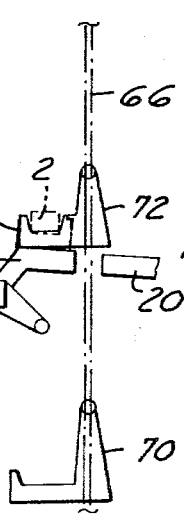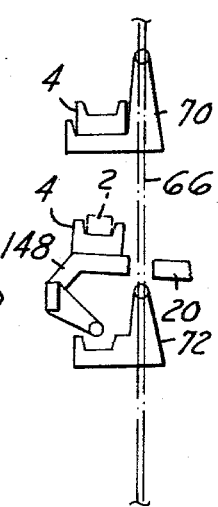

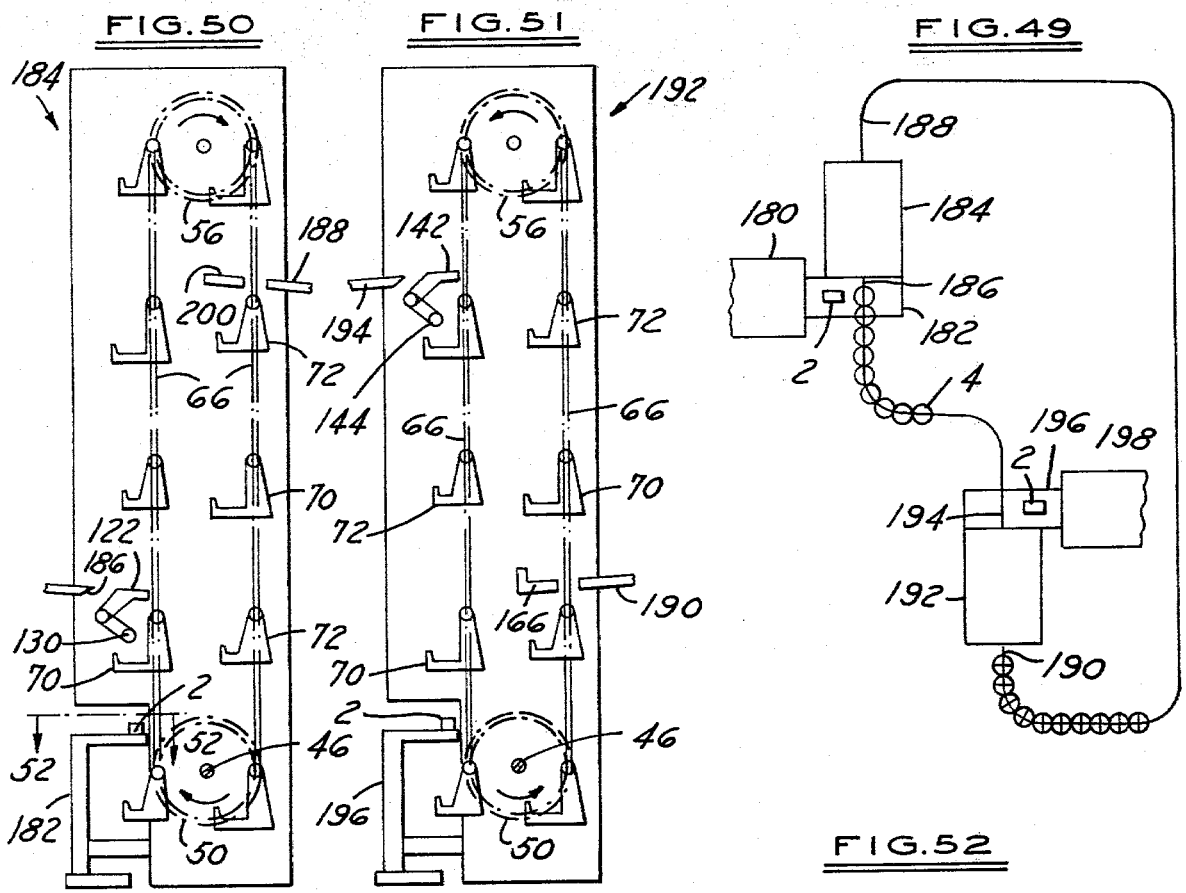
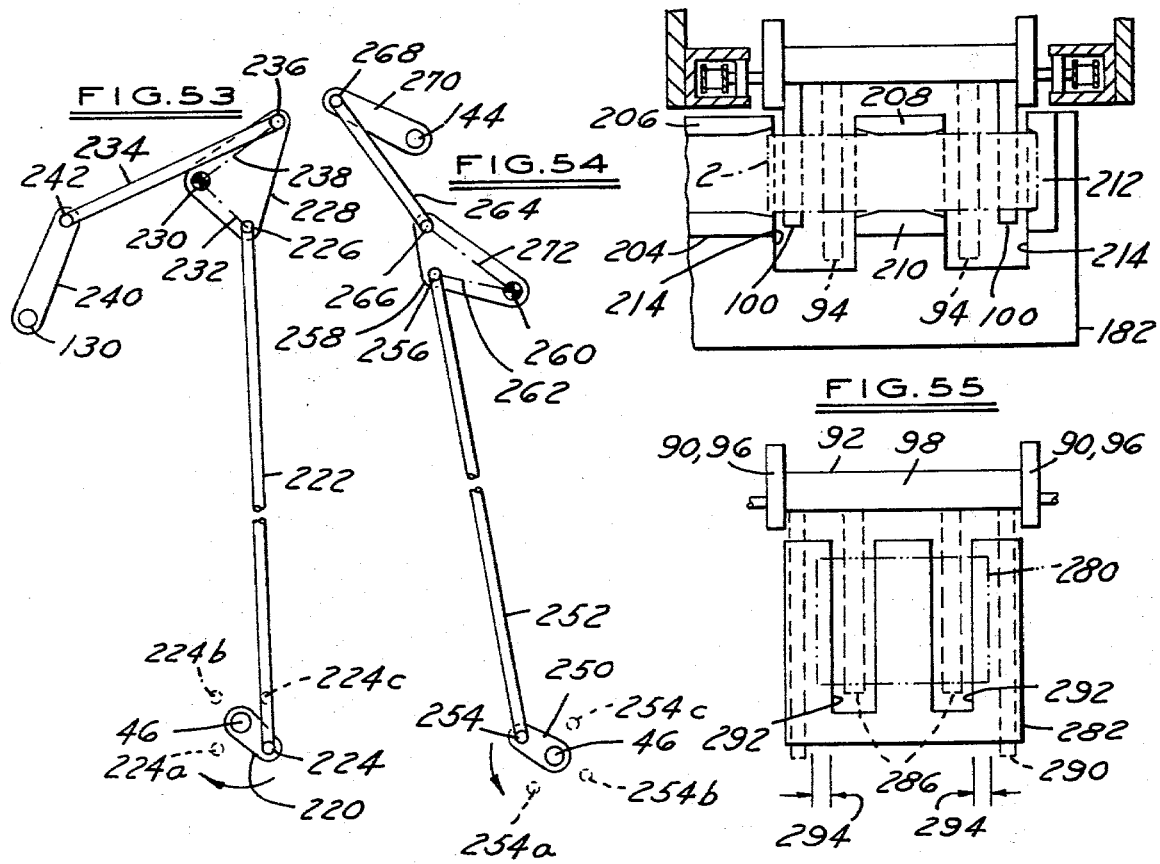

WORKPIECE VERTICAL CONVEYOR SYSTEM

FIELD OF INVENTION

Handling of workpieces in automated manufacturing line.

BACKGROUND FOR INVENTION

In the manufacturing of many workpieces on an automated line, it is oftentimes convenient to perform some operations on a given workpiece while that workpiece is in a free or unpalletized condition; while for other operations, it is more convenient to operate on a given workpiece while it is located and supported in a movable frame referred to as a pallet. One such situation arises in cases where the workpieces are machined in individual machines, transfer machines, or sections of transfer machine while in the unpalletized condition, and where the workpieces are transferred and/or temporarily stored between such machines while supported on a pallet. In the cases where this transferring and/or storage of palletized workpieces is accomplished in whole or in part by the movement of the pallets by gravity on a downward sloping track, it is necessary to elevate the pallets as well as to load the workpieces into them. Such an overall system is explained in detail in copending application of John H. Brems and James T. Graham, Ser. No. 908,941, filed May 24, 1978.

OBJECTS OF THIS INVENTION

It is one object of this invention to provide a mechanism which is capable of loading a pallet with a workpiece from a lower level and in the same mechanism releasing the loaded pallet at a higher level to provide the energy for a subsequent gravity powered movement along a track.

In systems of this type, it is inherently necessary to return an empty pallet from a position at which the workpiece is unloaded therefrom back to the load position. This empty pallet return is oftentimes performed by a downsloping track on which the pallet is propelled by gravity.

It is another object of this invention to provide a mechanism which is capable of unloading a full pallet from a lower lever and discharging an empty pallet at a higher level and in the same mechanism delivering the bare workpiece to any desired level.

When only the storage of workpieces is desired, without any interrelated transfer of workpieces from one point to another, the loading and unloading of pallets can occur at a single point on the main processing line. If additionally the workpieces are stored on pallets on downsloping tracks and empty pallets waiting to be loaded are similarly stored on downsloping tracks, it becomes necessary to elevate both empty pallets and full pallets as well as the loading and unloading of the pallets.

It is, therefore, another object of this invention to provide a mechanism which, in a single unit, is capable of loading or unloading pallets, and, while unloading, discharging empty pallets at a higher level than the level at which full pallets were received, and while loading, discharging full pallets at a higher level than the level at which empty pallets were received.

Other objects and features of the invention will be apparent in the following description, claims and accompanying drawings in which the principles of operation and use are set forth in connection with the best modes presently contemplated for the practice of the invention.

BRIEF DESCRIPTION OF DRAWINGS

Drawings accompany the disclosure and the various views thereof may be briefly described as:

FIG. 1, a plan view of a workpiece nested in a pallet.

FIG. 2, an end view of FIG. 1.

FIG. 3, a side view of FIG. 1 taken on line 3—3 of FIG. 2.

FIG. 4, a schematic plan view of a system employing the elevator-lowerator pallet loader-unloader.

FIG. 5, a side view of a pallet turn around mechanism.

FIG. 6, a vertical section through the elevator-lowerator pallet loader unloader.

FIG. 7, a horizontal section taken on line 7—7 of FIG. 6 at the workpiece load and unload conveyor.

FIG. 8, a vertical section taken on line 8—8 of FIG. 7.

FIG. 9, a horizontal section taken on line 9—9 of FIG. 6 through the upper sprockets.

FIG. 10, a vertical section taken on line 10—10 of FIG. 9.

FIG. 11, a horizontal section taken on line 11—11 of FIG. 6 at the empty pallet entry station.

FIG. 12, a vertical section taken on line 12—12 of FIG. 11.

FIG. 13, a partial side view taken at line 13—13 of FIG. 11.

FIG. 14, a horizontal section taken on line 14—14 of FIG. 6 at the full pallet exit station.

FIG. 15, a vertical section taken on line 15—15 of FIG. 14.

FIG. 16, an enlarged detail of FIG. 15.

FIG. 17, a horizontal section taken on line 17—17 of FIG. 6 at the full pallet entry station.

FIG. 18, a vertical section taken on line 18—18 of FIG. 17.

FIGS. 19 to 23, five schematic sequential drawings showing the workpiece pick-up sequence.

FIGS. 24 to 28, five schematic sequential drawings showing the empty pallet pick-up sequence.

FIGS. 29 to 33, five schematic sequential drawings showing the pallet loading sequence.

FIG. 49, a schematic plan view of a system employing a separate elevator pallet loader and elevator pallet unloader.

FIG. 50, a vertical section through an elevator pallet loader.

FIG. 51, a vertical section through an elevator pallet unloader.

FIG. 52, a horizontal section taken on line 52—52 of FIG. 50 at the workpiece pick-up station.

FIG. 53, a side view of the elevator pallet loader of a mechanical linkage to actuate the empty pallet entry gate.

FIG. 54, a side view of the elevator pallet unloader of a mechanical linkage to actuate the empty pallet exit gate.

FIG. 55, a schematic overlay of a different pallet, workpiece, and elevator buckets relationship.

DETAILED DISCLOSURE

Figure 34:
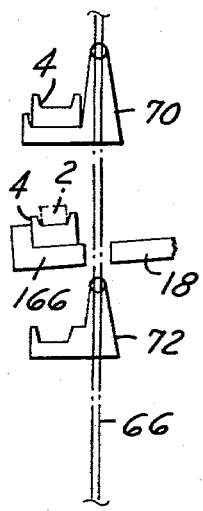
FIGS. 34 to 38, five schematic sequential drawings showing the pallet unloading sequence.

An illustrative pallet with a workpiece loaded therein is shown in three views in FIGS. 1, 2 and 3. The workpiece 2 is nested and located in a pallet 4; in this illustration, the workpiece 2 is representative of an internal combustion engine cylinder head or other part of comparable geometry. The pallet 4 is comprised of a casting or fabrication, whose upper surface is configured into a nest suitable for locating and supporting the workpiece 2; the lower surface of the pallet 4 is comprised of a flat plane surface on which the pallet can roll, under the power of gravity down a downwardly inclined track comprised of a family of rollers whose upper surfaces are adapted to contact this plane surface of the pallet. Two guide rollers 6 are mounted on the underside of the pallet and cooperate with a channel section (not shown) in the roller track to provide lateral guidance for the pallet as it moves down the track.

An illustrative system in which this invention can be advantageously employed is shown in FIG. 4. An automatic processing machine 8 discharges workpieces 2, on which it has completed its designated operations, onto a conventional power roll conveyor 10 on which the workpieces 2 are transferred to a second automatic processing machine 12 for subsequent operations.

This technique is widely used in industry at present, and is very satisfactory as long as machine 8 and machine 12 are discharging and accepting workpieces 2 to and from the conveyor 10 at the same rate. If, however, one machine or the other becomes temporarily inoperative, due to tool change or other delay, the other machine must also become inoperative shortly thereafter because of lack of space to discharge workpieces or unavailability of input workpieces.

To overcome this problem, one, solution is to remove or add workpieces from and to a roll conveyor to and from a storage system which is comprised of an overhead track system which stores both full and empty pallets.

As an example, in FIG. 4, one embodiment of this invention, shown diagrammatically, includes an elevator-lowerator 14 which can either supply workpieces 2 to the conveyor 10 or remove workpieces 2 from the conveyor 10. When supplying workpieces 2 to the conveyor 10, the elevator-lowerator 14 accepts loaded pallets 16, shown schematically as a circle with a crossline, from the lower end of a track 18 which originated at a higher level 20 on the same elevator-lowerator 14. It will be understood that the pallets form a queue on the descending full pallet track 20-18, from whose end 18 the elevator lowerator 14 takes full pallets 16 as required. These full pallets 16 are unloaded within the elevator-lowerator 14, the workpieces are delivered to the roll conveyor 10, and the resultant empty pallets 22 are discharged at a higher level 24 which is the origin of a descending track for unloaded pallets 22. This descending track terminates at a lower level 26 at the elevator-lowerator 14. The empty pallets 22 are schematically represented as open circles, and form a queue on the empty pallet track 24-26 terminating at the lower track level 26. It will be noted that for each workpiece 2 added to the roll conveyor 10, one full pallet 16 is removed from the queue on track 20-18 and one empty pallet 22 is added to the queue on track 24-26.

When removing workpieces from the roll conveyor 10, the elevator-lowerator 14 accepts empty pallets 22 from the lower level track 26, which are then loaded within the elevator-lowerator 14 with the workpieces 2 from the roll conveyor 10 and full pallets are discharged at the upper level track 20 to join the queue on full pallet track 20-18. It will be noted that for each workpiece 2 removed from the roll conveyor 10, one empty pallet 22 is removed from the queue on track 24-26 and one full pallet 16 is added to the queue on track 24-26.

With the system illustrated by FIG. 4, it is necessary to maintain the orientation of both the pallets 4 and workpieces 2 with respect to the elevator-lowerator 14 and roll conveyor 10 by turning the pallets 4, end for end, in a horizontal plane, at some point of each track section 20-18 and 24-26. This is accomplished by two rotatable track sections or turntables 28, schematically represented by large circles in FIG. 4 and shown in detail in FIG. 5.

In FIG. 5, a section of a frame 30 which supports fixed roller track 32 also has mounted to it a short section of roller track 34 through a shaft 36 and bearings 38. The fixed track 32 is terminated in close proximity to the ends of track section 34, and it will be noted that the surfaces of tracks 32 and 34 are coplanar and colinear. The track section 34 is rotatable about the axis of shaft 36; this shaft in turn is rotated through an angle of 180° by a cylinder, gear rack and pinion or by a gear reducer or other suitable conventional mechanism, not shown. Also not shown because of its conventional design is a retractable stop through which a pallet 4 rolling down track 32 onto track 34 is stopped when it is fully on the track section 34. The track section 34 is then rotated through an angle of 180° bringing it back into alignment with the tracks 32; and the pallet 4 is thereby turned end for end. The stop is retracted and the pallet 4 continues down the track 32 but in the opposite orientation, so that it presents itself to the elevator-lowerator in the same orientation it had when it departed at the higher elevation.

The functional characteristics of one embodiment of this invention, the elevator-lowerator 14, in an illustrative application, has been described in connection with FIG. 4. The structural characteristics, which provide this function is shown in FIG. 6 and the various more detailed sections taken thereof.

Referring to FIG. 6, a schematic vertical section, two side plates 40 are suitably spaced by lower spacers 42 and upper spacer 44. A lower sprocket shaft 46 is journalled in the side plates 40 through pillow blocks 48 (FIG. 7) and has mounted thereon two lower sprockets 50. This shaft 46 is driven by sprocket or pulley 52 and by chain or belt 54 from a suitable gear reducer and motor, and most advantageously, the sprocket 52 may be driven by an intermittent indexing mechanism 55 such as those shown in my U.S. Pat. Nos. 3,789,676; 3,859,862; and 4,075,911.

Referring to FIGS. 6, 9 and 10, two upper sprockets 56 are journalled on stub shafts 58 through bearings 60; the stub shafts 58 are in turn mounted in blocks 62 at the ends of a tubular ⊔ frame 64, which is supported from the side plates 40. The upper shafts 58 are not a continuous shaft as is the lower shaft 46 in order to provide the necessary clearances to be subsequently described.

Two parallel, spaced chain loops 66 operate between the spaced upper sprockets 56 and lower sprockets 50. Suspended from these chains are two types of hanging carriers or buckets. One type of carrier or bucket 70 is configured to carry a pallet 4 and will be referred to as a P-bucket 70; the other type of carrier or bucket 72 is configured to carry a workpiece and will be referred to as a W-bucket 72. It will be noted, FIG. 6, that the W-buckets 72 and P-buckets 70 are alternately mounted to the chains 66 at substantially equal spacing; this equal spacing is desirable but not necessary.

Both the P-buckets 70 and the W-buckets 72 are suspended from the chains 66 by pins 74, on which the buckets are free to pivot and thereby hang in a substantially constant attitude as shown in FIG. 6. A guide roller 76 is mounted on each pin 74, and each roller 76 is in turn guided by channels 78 mounted to the siderails 40 to control the position of the pins 74 as the buckets are moved along the vertical chain flights.

Both the P-buckets 70 and the W-buckets 72 also have mounted to them auxiliary guide rollers 80, FIGS. 8 and 10, which also operate through the guide channels 78. This combination of rollers 76 and 80 in channels 78 serve to control the attitude of the buckets during their vertical movements. The ends of the channels 78 are bellmouthed at their ends, as at 82 (FIGS. 7 and 8) and 84 (FIGS. 9 and 10) to assist in the entry of the guide rollers 80. It should be noted that the rollers 80 are not connected to the chains 66 and that the W-buckets 72 and P-buckets 70 are free to hang in a dependant attitude while traversing between the channels at both the upper sprockets 56 and lower sprockets 50. It will further be noted that this hanging attitude of both the P-buckets 70 and W-buckets 72 would create an interference with the upper shaft 58 if that shaft were continuous between the two sprockets 56, hence the need for the two separate stub shafts 58 previously described.

As previously noted, the P-buckets 70 are configured to locate and support the pallets 4. Each P-bucket is comprised of two side hanger plates 90 (FIGS. 7, 11 and 12) on which are mounted the chain connection pins 74 and auxiliary guide rollers 80; a spacer bar 92 interconnects the two hangers 90 and in turn supports two cantilever arms 94 whose upper surfaces are formed to support and locate a pallet 4.

Similarly, the W-buckets 72 are configured to locate and support the workpieces 4. Each W-bucket is comprised of two side hanger plates 96 (FIGS. 7 and 8) on which are mounted the chain connection pins 74 and auxiliary guide rollers 80; a spacer bar 98 interconnects the two hangers 96 and in turn supports two cantilever arms 100 whose upper surfaces are formed to support and locate a workpiece 2. The cantilever arms 100 of the W-buckets are spaced more widely apart than the width of the pallet 4 and accordingly can move past a pallet 4 whenever such a pallet 4 is otherwise supported and in a position such that the workpiece 2, supported by the arms 100, is vertically in line with the position it would have if supported by the pallet.

Referring to FIGS. 7 and 8, the roll conveyor 10, from which workpieces 2 are removed or replenished, is comprised of a series of structural supports 102 which support a mounting plate 104. On this plate are supported a series of rollers 106 which are mounted on shafts 108 which are suitably journalled in bearings in risers 110 and 112. Sprockets 114 and 116 are mounted on shafts 108 and are interconnected by suitable chain loops with adjacent shafts 108. All rollers 106 are driven in unison by a conventional drive (not shown) comprising a suitable motor and gear reducer. This roll conveyor 10 is of conventional construction except for two slots 118, FIG. 7, in the mounting plate 104 having a depth and width to permit the free vertical passage of the arms 100 of the W-buckets and of the arms 94 of the P-buckets. In FIG. 7, this clearance is shown by the solid lines for arms 100 and the dotted lines for arms 94. It will be noted that the spacing of the rollers 106 also provides this same clearance.

When a workpiece 2 is supported on the rollers 106 of the roll conveyor 10, it will be positioned to be picked up by the arms 100 of the W-bucket 72. To accomplish this, the workpiece 2 is stopped by a conventional cylinder actuated stop or escapement 119 which temporarily holds it in the appropriate position until it is picked up by the arms 100. Similarly, if a workpiece 2 is being delivered to the roll conveyor, the arms 100 deliver it to the conveyor 10 in the position shown in FIG. 7.

In addition to the pick-up and deposit position for the workpieces 2 on the roll conveyor 10 as described above, there are four connections or interfaces between the pallet tracks and the elevator-lowerator 14, which are (1) the entry of empty pallets on track 26, (2) the exit of empty pallets on track 24, (3) the exit of full pallets on track 20, and (4) the entry of full pallets on track 18. The mechanisms at each of these interface positions or stations will now be described.

The mechanism associated with the track for the entry of empty pallets is shown in FIGS. 11, 12 and 13. The end of the fixed portion of the track 26 is supported from the sideframes 40 by a crossbeam 120. A movable portion of the track referred to as a gate 122 forms an extension of the fixed track 26 when the gate 122 is in its extended position, i.e., the rollers on which the pallet rolls on gate 122 are substantially coplanar with those on the fixed track 26. Furthermore, the gap between the last rollers on the fixed track 26 and the first rollers on the gate 122 are sufficiently close to permit a pallet 4 rolling down the fixed track 26 to roll onto the gate 122 where it is stopped by a stop 124 in a position shown as 4a, FIG. 12. The gate 122 is supported from a tubular crossbeam 126 which in turn is supported by two cheek plates 128 mounted on coaxial shafts 130. The shafts 130 are journalled in the sideframes 40 through pillow blocks 132. On one side, a shaft 130 extends through the sideframe 40 to mount an actuating lever 134. This lever 134 is connected to a clevis element 136 on an actuating cylinder 138 whose other end is mounted to the sideframe 40. The cylinder 138 actuates the lever 134 between two positions determined by the stop pins 140 mounted on the sideframe 40. These two positions correspond to the two positions of the gate 122, the extended position shown in solid lines in FIG. 12 and a retracted position shown by the dotted lines in FIG. 12.

It will be noted that when the gate 122 is in its extended position, both the P-bucket 70 (shown FIG. 11) and W-bucket can move vertically past the gate without interference. If a pallet 4 is in position 4a, an upward moving P-bucket 70 will engage and lift that pallet off the gate and carry it upward. With the gate 122 in its retracted position, shown dotted, a W-bucket 72, even though carrying a workpiece 2, can move through the station without interference.

Referring to FIG. 6, the mechanism at the station for the exit of empty pallets at fixed track 24 is substantially identical with the mechanism described in connection with FIGS. 11, 12 and 13, except that the pallet exit gate 142 and track 24 are sloped in the opposite direction to carry pallets 4 deposited thereon out of the station. The gate 142 is pivoted on two stub shafts 144 on which it can be moved between two positions, an extended position and a retracted position, by a cylinder mechanism identical with that shown in FIG. 13. With the gate 142 in its extended position, the track rollers mounted thereon are substantially coplanar with the rollers on fixed track section 24; this permits a pallet 4 deposited thereon by a descending P-bucket 70 carrying a pallet 4 to roll out on track 24. The descending P-bucket arms 94 do not interfere with the gate 142 in its extended position. With the gate 142 in its retracted position, a W-bucket 72 even though carrying a workpiece 2 can move through the station without interference, and similarly an ascending P-bucket 70, even though carrying a pallet 4 can also move through the station without interference.

The mechanism at the station for the exit of loaded pallets 16 onto fixed track 20 at the upper right of FIG. 6 is shown in FIGS. 14, 15 and 16. The end of the fixed portion of the track 20 is supported from the sideframes 40 by a crossbeam 146. A movable portion of the track, gate 148, forms an extension of the fixed track 20 when the gate 148 is in its extended position as shown in solid lines in FIG. 15; and a pallet 4 deposited thereon can roll out on fixed track 20. The gate 148 is mounted on a beam 150 whose two ends are supported by cheek plates 152 which are mounted on coaxial shafts 154; the shafts 154 are journalled to the sideplates 40 through pillow blocks 156. One shaft 154 extends through a sideplate 40 and is actuated between two positions by a lever 134 mounted thereon by a mechanism substantially identical with the mechanism described in connection with FIG. 13.

When a pallet 4 is deposited on the gate 148, in its extended position, by a descending P-bucket 70 carrying a pallet 4, such a pallet may be temporarily held on the gate 148, and restrained from rolling away onto the fixed track 20, by a cylinder actuated stop which is shown in detail in FIG. 16. This stop mechanism is mounted on the gate 148 and is comprised of a pawl pivoted to the gate 148 through a pivot pin 160. This stop pawl is actuated by a cylinder 162 also mounted to the gate 148. With the cylinder 162 and stop pawl 158 in their extended positions, the outboard end of the pawl 158 engages the guide roller 6 mounted on the underside of pallet 4 and prevents the pallet 4 from rolling out on gate 148 due to its downward inclination. With the cylinder 162 and stop pawl 158 retracted, the pawl is free of the path of roller 6 and the pallet 4 is free to roll away.

With the gate 148 in its extended position, both the P-buckets 70 and W-buckets 72 can move through the station if not carrying pallets 4 or workpieces 2, respectively. With the gate 148 in its retracted position, as shown dotted in FIG. 15, the P-buckets 70 carrying pallets 4, and the W-buckets 72 carrying workpieces 2 can each pass through the station without interference. With the gate 148 extended, it should be noted that the gap between the fixed track section 20 and gate 148 is wide enough to permit passage of the spacer bars 92 and 98 of the P-buckets 70, and W-buckets 72 respectively.

The mechanism at the station at the lower right of FIG. 6 for the entry of loaded pallets 16 on fixed track 18 is shown in FIGS. 17 and 18. The end of the fixed portion of track 18 is supported by a beam 164 mounted on the sideframes 40. This track 18 ends just short of the plane generated by the vertical paths of the spacer bars 92 and 98 of the P-buckets 70 and W-buckets 72, respectively. A continuing short section of fixed track termed a fixed gate 166 is also mounted to the sideplates 40 through a crossbeam 168. It should be noted that the crossbeam 168 is positioned so as not to interfere with the arms 100 of the W-buckets 72 nor with the arms 94 of the P-buckets 70, which are shown dotted in FIG. 17. Furthermore, the other end of the fixed gate 166 ends just short of the plane generated by the vertical paths of the spacer bars 92 and 98 of the P-buckets 70 and W-buckets 72, respectively. The fixed gate 166 is therefore essentially a simple continuation of the track 18 except for a gap to permit the vertical passage of the spacer bars 92 and 98. This gap is also small enough to be bridged by a pallet 4 rolling down track 18 onto the fixed gate 166. The pallet 4 is stopped on the fixed gate 166 by a fixed stop 170, at a position 4c, in which position it can be picked up by an upward moving P-bucket 70. It will be noted that an upward moving W-bucket 72 will not pick up the pallet 4 due to the wider spread of the arms 100 which will only pick up the workpiece 2 which overhangs the pallet. This feature is very useful as will be described in connection with the sequencing at each interface stations.

Escapements of conventional design are provided at the two entry stations on track 18 for loaded pallets, and on track 26 for empty pallets. Essentially, each escapement consists of two retractable stops actuated by two cylinders, or actuated by one cylinder and mechanically interconnected. The first stop holds back all pallets 4 in the queue; the second stop holds back all pallets in the queue except the first pallet in the queue. The sequencing is accomplished by a conventional and simple escapement mechanism. Normally, the first stop is engaged holding back all pallets 4; to release a pallet the second stop is engaged and the first stop is released. This permits the leading pallet to roll down the track and on to the associated gate. After the leading pallet is clear, the first stop is re-engaged and the second stop is released. All the pallets in the queue advance one pallet length interval to await the next cycle.

Clockwise Direction Operation

The mechanism described above is capable of loading or unloading pallets depending only on its direction of rotation and the sequencing characteristics of its several gates. When loading pallets 4 with workpieces 2 from the roll conveyor 10, the sprockets 50 and 56 (FIG. 6) both rotate clockwise and the buckets 70 and 72 on the left vertical flight of chain move upward while the buckets on the right vertical chain flight move downward. The gate 142 for empty pallet exit is retracted and remains retracted, and the gate 148 for full pallet exit is extended and remains extended during an entire pallet loading cycle.

A cycle takes place when the chain 66 moves a distance equal to two bucket pitches, which is also equal to the distance between two buckets of the same type, i.e., either the distance from one P-bucket 70 to the next P-bucket 70, or its equal, the distance from one W-bucket 72 to the next W-bucket 72.

For convenience in describing the events that occur at each of the three stations, each cycle, as represented by the chain 66 movement described above, is divided into four substantially equal stages of chain 66 movement. Therefore, each stage of chain movement which is referred to as a module is equal to one-fourth of the distance between adjacent buckets of the same type or its equal, one-half of the distance between adjacent buckets of different types, when the spacing between all buckets is substantially identical as is presumed for the purposes of the following description.

The events which occur at the interface between the roll conveyor 10 and the elevator-lowerator 14 during the four stages of a pallet 4 lift and load cycle are shown schematically in FIGS. 19 to 23.

FIG. 19 shows the condition which exists between the roll conveyor 10 and the adjacent buckets on the chain 66 at the beginning of a four stage cycle; it will be noted that a workpiece 2 is in position for pick-up on the roll conveyor 10; an empty W-bucket 72 is positioned one module below this position, and an empty P-bucket is positioned one module above this position.

FIG. 20 shows the condition which is reached after the chain 66 has moved upward one module during the first stage of a cycle; the W-bucket 72 has reached the workpiece 2 position on the roll conveyor 10 and the leading P-bucket 70, still empty, has moved upward and out of the picture while the following P-bucket 70, also empty, has entered the picture from below.

FIG. 21 shows the condition which is reached after the second stage of a cycle and the chain 66 has moved two modules upward; the W-bucket 72 has lifted the workpiece 2 from the roll conveyor 10, which is now empty, and the following empty P-bucket 70 is now one module below the roll conveyor 10.

FIG. 22 shows the condition which is reached after the chain 66 has moved three modules upward after the third stage of the cycle; the full W-bucket 72 (carrying a workpiece 2) has moved upward out of the picture, while the following empty P-bucket 70 is moving through the empty roll conveyor 10 without interference.

FIG. 23 shows the condition which is reached after the chain 66 has moved four modules upward and after the fourth and final stage of the chain cycle which is now complete. It will be noted that the workpiece 2 has been lifted from the conveyor 10 and is now being carried by the W-bucket 72 which is three modules above. An empty P-bucket 70 is positioned one module above the roll conveyor 10, and an empty W-bucket 72 is positioned one module below the roll conveyor 10. At the completion of this chain movement, a new workpiece 2 is rolled into alignment with the bucket travel path and the conditions of FIG. 19 are reattained and a new cycle can begin. In summary, as the chain 66 moves the buckets upward through the roll conveyor 10, all W-buckets 72 remove workpieces 2 from the roll conveyor 10, while the P-buckets 70 continue upward empty.

The events which occur at the interface between the empty pallet entrance gate 122 and the elevator-lowerator 14 during four stages of elevator movement are shown schematically in FIGS. 24–28.

FIG. 24 shows the condition which exists between the empty pallet entrance gate 122 and the adjacent buckets on the chain 66 at the beginning of a four stage cycle; it will be noted that an emtpy pallet 4 is in position for pick-up on the gate 122; an empty P-bucket 70 is positioned one module below this position and a full W-bucket 72 is positioned one module above this position, having picked up a workpiece 2 at the roll conveyor 10 as shown in FIGS. 19–23.

FIG. 25 shows the condition which is reached after the chain 66 has moved upward one module during the first stage at the empty pallet pick-up station; the empty P-bucket 70 has reached the emtpy pallet 4 on the gate 122 and the leading full W-bucket 72 has moved upward out of the picture, while the following full W-bucket 72 has entered the picture from below.

FIG. 26 shows the condition which is reached after the second stage of a cycle and the chain 66 has moved two modules upward. The P-bucket 70 has lifted the pallet 4 from the gate 122 (shown in dotted line in this figure), which is now empty. This P-bucket 70 is one module above the gate 122, while the following full W-bucket 72 is one module below the gate 122. It is at this time that the gate 122 is moved from its extended position shown dotted to its retracted position 122a shown in solid lines.

FIG. 27 shows the condition which is reached after the chain 66 has moved three modules upward after the third stage of the cycle; the full P-bucket 70, carrying a pallet 4, has moved upward out of the picture, while the following full W-bucket 72 is moving through the station of gate 122 without interference since gate 122 is held retracted.

FIG. 28 shows the condition which is reached after the chain 66 has moved four modules upward and after the fourth and final stage of the chain cycle which is now complete. The full W-bucket 72 is now one module above the position of gate 122 and therefore clear of gate 122 which at this time swings back to its extended position 122 from its retracted position 122a. It will be noted that the pallet 4 has been lifted from the gate 122 and is now being carried by the P-bucket 70, three modules above the position of gate 122. The next P-bucket 70, still empty, is positioned one module below the position of gate 122. At the completion of this chain movement, the next empty pallet on track 26 is released by its escapement to roll down and be stopped on gate 122 and the conditions of FIG. 24 are reattained and a new cycle can now begin. In summary, as the chain 66 moves the buckets upward past the empty pallet entry gate 122, all P-buckets 70 remove empty pallets 4 from the gate 122, while all the W-buckets 72, already loaded with workpieces 2 from the roll conveyor 10 move past the entry gate 122 which is retracted to allow their passage. Therefore, all buckets moving upward beyond the position of gate 122 are loaded with the respective items they are adapted to carry. These loaded buckets, P-buckets 70 or W-buckets 72, pass sequentially over the upper sprockets 56 and move downward on the right-hand chain flight (FIG. 6). There they encounter gate 148 which is always extended during the pallet loading mode.

The events which occur at the interface between the full pallet exit gate 148 at the upper right of FIG. 11, and the elevator-lowerator 14 during the four stages of a pallet 4 exit cycle are shown schematically in FIGS. 29–33.

FIG. 29 shows the condition which exists between the full pallet exit gate 148 and the adjacent buckets on the chain 66 at the beginning of a four-stage cycle; it will be noted that a P-bucket 70 carrying a pallet 4 is positioned one module above the gate 148 while an empty W-bucket 72 (having been emptied on the previous cycle) is positioned one module below the gate 148. While not shown in FIG. 29, it is clear that the W-bucket 72 positioned three modules above the gate 148 is carrying a workpiece 2.

FIG. 30 shows the condition which is reached after the chain 66 has moved downward one module during the first stage at the full pallet exit station; the full P-bucket 70 has descended to the level where the empty pallet 4 it has been carrying is deposited on the gate 148 while the already empty W-bucket 72 is now two modules below the level of gate 148.

FIG. 31 shows the condition which is reached after the second stage of a cycle and the chain 66 has moved two modules downward. The P-bucket 70 has deposited the empty pallet 4 onto the exit gate 148 and is now positioned one module below the exit gate 148. The empty pallet 4 is temporarily held on the exit gate 148 by the stop mechanism (FIG. 16). A W-bucket 72 carrying a workpiece 2 is positioned one module above the exit gate 148.

FIG. 32 shows the condition which is reached after the chain 66 has moved three modules downward after the third stage of the cycle; the full W-bucket 72 has lowered the workpiece 2 it has been carrying into the pallet 4 waiting on gate 148, thereby loading the pallet. The empty P-bucket 70 is now two modules below the gate 148.

FIG. 33 shows the condition which is reached after the chain 66 has moved four modules downward and after the fourth and final stage of the chain cycle which is now complete. The W-bucket 72, having delivered the workpiece 2 into the pallet 4 on gate 148, is now positioned one module below the gate 148. The pallet 4 is now loaded or full and is released by the cylinder stop on gate 148 (FIG. 16) and it rolls away from gate 148 to track 20. As soon as this loaded pallet 4 has cleared the gate 148, the full cycle has been completed at this station, and a new pallet load cycle can begin. It will be noted that a full P-bucket 70 is positioned one module above the gate 148 and the conditions of FIG. 29 have been reattained. In summary, as the chain 66 moves the loaded buckets downward past the gate 148, a P-bucket 70 first deposits an empty pallet 4 on the gate 148 where it is temporarily held until a following W-bucket 72 deposits a workpiece 2 into the pallet 4, thereby loading it, and as soon as the now empty bucket W-bucket 72 clears the station, the full pallet 4 is released to roll away completing the cycle.

The entire pallet load operation may be simply summarized by noting that workpieces 2 are picked up from the roll conveyor 10 by the W-buckets 72, and empty pallets 4 are picked up selectively from the reciprocating gate by the P-buckets 70, and all buckets are loaded as they pass over the upper sprockets 56; on the descending flight of chain 66 each empty pallet 4 is deposited on the gate 148 to be loaded with a workpiece from a following W bucket 72. All buckets which have moved downward past the gate 148 are now empty and they remain empty as they move around the lower sprockets 50 to be reloaded at roll conveyor 10 and gate 122.

The sequence at each interface was described in terms of four stages of movement of the chain 66 which constituted a chain cycle, at the end of which an external (non chain) event needed to occur; e.g., a new workpiece 2 brought in by the roll conveyor 10, or a new empty pallet 4 roll onto gate 122, or a full pallet 4 roll out on gate 148. When these three external events occur simultaneously the stages of chain movement at each of the three interface stations then also occur simultaneously; e.g., stage 1 at roll conveyor 10 occurs while stage 1 also occurs at gates 122 and 148, etc. This imposes definite spacing requirements on the positions of the various interface stations with respect to each other. Gate 122 must be two modules above roll conveyor 10 (as shown in FIG. 6) or it can be 2+4N modules above it, where N=0, 1, 2, etc., while still maintaining the appropriate relationship to the bucket pattern. Similarly, the gate 148 must be 4N modules beyond gate 122, where N=1, 2, 3, etc., to maintain the appropriate relationship to the bucket pattern.

To circumvent these station spacing requirements, it is possible to stagger the stage relationships at the various interface stations, e.g., stage 1 can occur at the roll conveyor 10 while stage 2, 3, or 4 occurs at the other two stations. When the various stages at the three interface stations need not coincide, then there is no requirement for specific station spacing. It is only necessary that the chain 66 pause at the end of stage 4 at any of the three interface stations, to permit the external event associated with that station to occur, even though there are multiple pauses in a cycle.

When moving between the one or more pauses required at the end of the fourth stage of movement at each interface station, the chain 66 may be started and stopped by merely starting and stopping the drive motor. A more desirable situation is achieved when each module of movement of chain 66 is an acceleration-deceleration increment separated by a natural dwell, such as generated by indexing mechanism 55 as described in my previously referenced patents. At any given interface station, then, the four stages of movement, each consisting of an acceleration-deceleration increment equal to one module comprises a total cycle. It can be seen that under these conditions the pick-up or deposition of a workpiece 2 or pallet 4 will always occur very near to the zero velocity point of the chain movement 66, resulting in an extremely smooth and quiet interchange, if the bucket positions are properly related to the natural movement dwells.

From the foregoing figures and descriptions, it can be seen that the mechanism is capable of removing a workpiece 2 from the roll conveyor 10 and loading it into a pallet 4 which was received empty at a lower level and discharging it full at a higher level.

Counterclockwise Direction Operation

This same mechanism, rotating in the opposite direction, i.e., with sprockets 50 and 56 rotating counterclockwise, is aso capable of unloading full pallets 4 received at a lower level on track 18, discharging the empty pallets 4 at a higher level track 24, and depositing the workpiece 2 on the roll conveyor 10. In this mode, the chain 66 on the right-hand flight (FIG. 6) moves upward while the left-hand flight moves downward. During pallet unloading, the full pallet exit gate 148 is retracted and remains retracted; similarly, the empty pallet entrance gate 122 is retracted and remains retracted; the empty pallet exit gate 142 retracts and extends with each cycle as will be explained, and the full pallet entrance gate 166 is fixed at all times.

Figure 35:
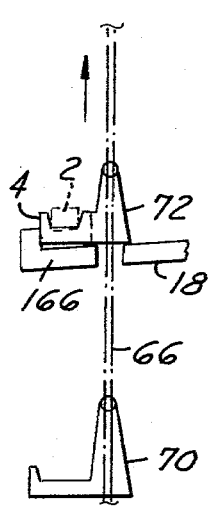
Figure 36:
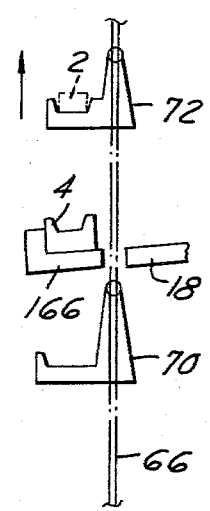
Figure 37:
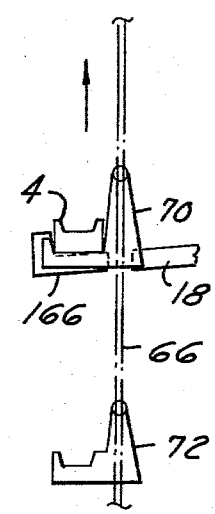
Figure 38:
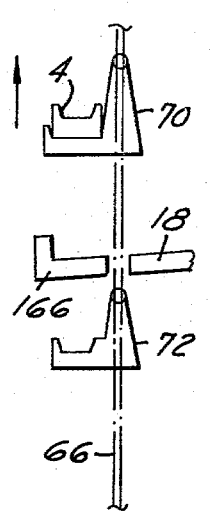
Figure 39:
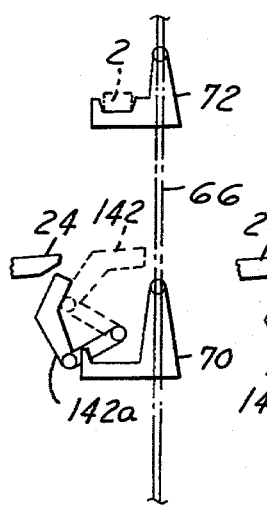
FIGS. 39 to 43, five schematic sequential drawings showing the empty pallet deposit sequence.
Figure 40:
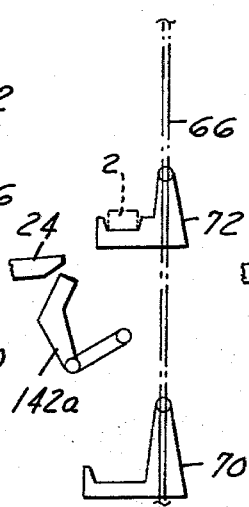
Figure 41:
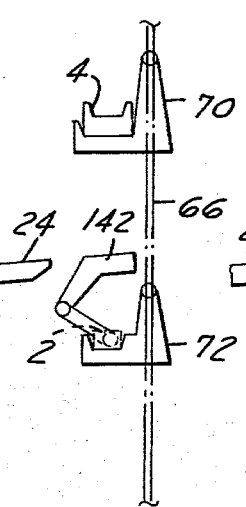
Figure 42:
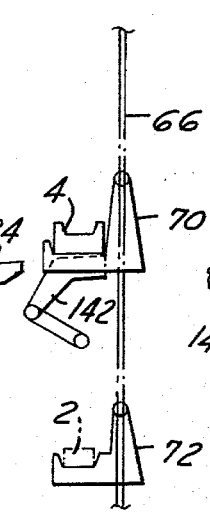
Figure 43:
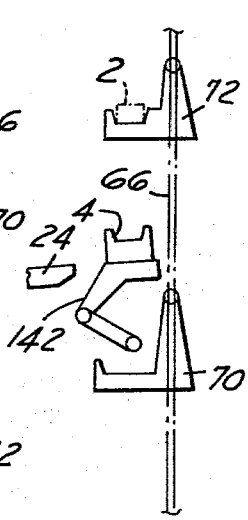
Figure 44:
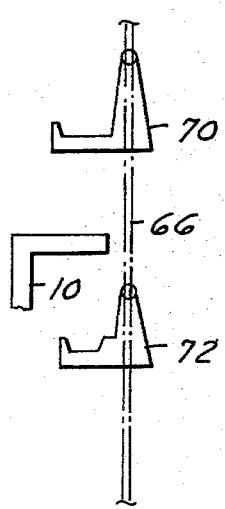
FIGS. 44 to 48, five schematic sequential drawings showing the workpiece deposit sequence.
Figure 45:
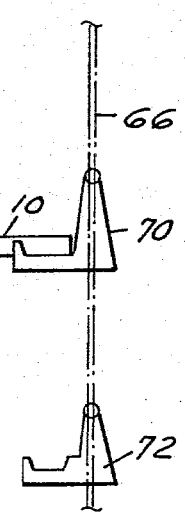
Figure 46:
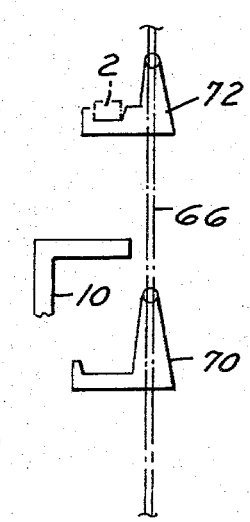
Figure 47:
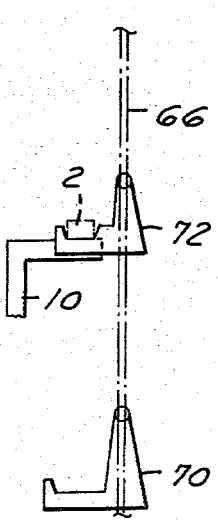
Figure 48:
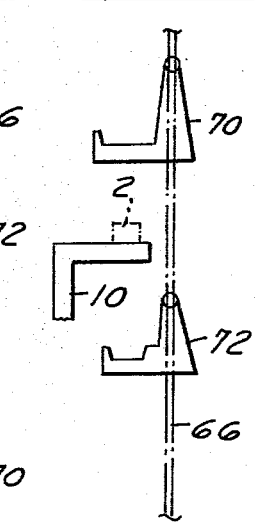

The events which occur at the fixed full pallet entry gate 166 during the four stages of upward chain movement at that station are shown schematically in FIGS. 34 to 38. At the beginning of the four stage cycle, FIG. 34, a full pallet is positioned on gate 166, having rolled thereon after having been released by the escapement on track 18; a full P-bucket 70 is positioned one module above the gate 166, and an empty W-bucket 72 is positioned one module below the gate 166. During the four stages of chain upward movement, the first bucket moving upward through the station, a W-bucket 72, lifts the workpiece 2 out of the pallet 4, leaving the pallet 4 still on the gate 166 (FIGS. 35 and 36). The next bucket to move through the station, a P-bucket 70, picks up the now empty pallet 4, FIG. 37, from the gate 166 and at the end of the chain 66 movement, this now loaded P-bucket 70 is positioned one module above the gate 166. The escapement on track 18 now releases the next full pallet to roll onto and be stopped on gate 166 and a new chain movement cycle can begin. It will be noted that all buckets moving upward through the gate 166 become loaded with either workpieces 2 or empty pallets 4 according to their configuration.

The events which occur at the movable empty pallet exit gate 142 during the four stages of downward chain 66 movement at that station are shown schematically in FIGS. 39-43. At the beginning of the cycle, FIG. 39, an empty P-bucket 70 is positioned one module below the gate 142 and a full W-bucket 72 is positioned one module above the gate 142; at this time the gate 142 swings to a retracted position 142a after the empty pallet 4, deposited thereon during the previous cycle, has rolled away on track 24. During the four stages of chain 66 downward movement, the first bucket moving downward through the station is a W-bucket 72 carrying a workpiece 2, which moves past the retracted gate 142a, FIG. 40; after its passage, FIG. 41, the gate returns to its extended position 142. The next bucket through the station, a P-bucket 70 deposits an empty pallet 4 on the gate 142, FIG. 42, and continues downward one module to complete the chain 66 movement cycle, FIG. 43. The empty pallet 4 deposited on gate 142 is free to roll away on track 24, and as soon as it is clear, the gate 142 retracts to position 142a (FIG. 39) and a new chain movement cycle can begin.

The events which occur at the roll conveyor 10 during the four stages of downward movement of the chain 66 are shown schematically in FIGS. 44-48. At the beginning of a cycle, FIG. 44, the deposit position on the roll conveyor 10 is empty, the workpiece 2 deposited on the previous cycle having been carried away by the roll conveyor 10; an empty W-bucket 72 is positioned one module below the roll conveyor 10, and an empty P-bucket 70 is positioned one module above the roll conveyor 10. During the four stages of chain downward movement, the first bucket to move through the station, an empty P-bucket 70 moves through without interference, FIGS. 45 and 46. The next bucket to move through the station, a full W-bucket 72 deposits a workpiece 2 on the roll conveyor 10, FIG. 47, and continues downward one module, FIG. 48, ending the chain movement cycle. The workpiece 2 deposited on the roll conveyor 10 is carried away by it, reattaining the conditions of FIG. 44 and a new chain movement cycle can begin.

The pallet unload sequence is essentially the inverse of the pallet load sequence and may be summarized by noting that workpieces 2 and empty pallets 4 are sequentially picked up by the appropriate buckets from the fixed gate 166; that all buckets are loaded as they pass over the upper sprockets 56; that the P-buckets 70 deliver the empty pallets 4 to the gate 142 which is periodically retracted during each cycle; that the W-buckets 72 carrying workpieces 2 move past the retracted gate 142 to deliver the workpieces 2 to the roll conveyor 10; and that all buckets are empty as they pass over the lower sprockets 50 to become reloaded at the fixed gate 166.

As was the case with the gates associated with the pallet load cycle, very specific spacing requirements must be met if the stages of chain movement at the three stations coincide. But if this coincidence of stages is not required and is replaced by suitable pauses at the end of the fourth stage for each station, then the stations may position at any of the module positions consistent with the output and input track requirements.

It can be seen, therefore, that by reversing the direction of rotation of the sprockets 50 and 56, this same mechanism can receive full pallets at a lower level, unload the workpieces 2 from the pallets 4, discharge the empty pallets at a higher level and deposit the workpieces on the roll conveyor 10.

While the mechanism described above is capable of either loading or unloading pallets, while elevating the pallets in either mode, many applications arise in which a single mechanism is used to load and elevate the pallets and a separate mechanism is used to unload and elevate the pallets. A system in which such separate mechanisms are advantageously applied is shown in FIG. 49.

Workpieces 2 are discharged from a processing machine 180 onto an interface platform 182 by the machine internal transfer system. From this platform 182 the workpieces are elevated by an elevator pallet loader 184 which is a simplified version of the mechanism of FIG. 6. Empty pallets 4 are received on a low level track 186 and are discharged, loaded with a workpiece 2, on a high level track 188. On this descending track, they roll down to its end 190, forming a queue thereon. This track 190 is the low level entry for a lowerator pallet unloader 192 which accepts loaded pallets at the track 190 and discharges empty pallets 4 onto a high level track 194 and delivers the workpieces 2 to a loading platform 196 which is the entry station of the next processing machine 198, from which the workpieces 2 are pulled into the machine 198 by its own transfer system. The empty pallets 4 discharged on track 194 descend by gravity to the lower level 186 forming a queue thereon. It can be seen that this system transfers workpieces 2 from one position on the line, to a next position on the line, in addition to storing them, and the roll conveyor 10 (FIG. 4) is not required.

A schematic vertical section of the elevator pallet loader 184 is shown in FIG. 50. This mechanism is substantially identical with the reversible pallet loader unloader 14 shown in FIG. 6, except that the elevator pallet loader sprockets 50 and 56 rotate only in a clockwise direction and the fixed full pallet entry gate 166 and the movable empty pallet gate exit gate 142 are deleted; furthermore, the full pallet exit gate 148 (FIG. 6) which was movable is now a fixed gate 200.

The operating sequences at the three interface stations of the elevator pallet loader 184 are the same as those described for the relevant stations of the elevator pallet loader unloader 14. The sequence for the lifting of the workpiece 2 from the platform 182 is identical with that described in connection with FIGS. 19-23 except that the roll conveyor 10 is replaced by platform 182. The sequence for the lifting of the empty pallet from the empty pallet entry gate 122 is the same as described in connection with FIGS. 24-28, except that the track 26 is replaced by track 186. The sequence for the loading and discharge of loaded pallets on fixed gate 200 is the same as described in connection with FIGS. 29-33 except that the movable gate 148 is replaced by fixed gate 200 and the exit track 20 is replaced by exit track 188. It will be noted that the gate 148 did not move as part of a loading cycle, but was retracted only when the mechanism of FIG. 6 was operating as a pallet unloader.

The conditions which exist at the loading platform 182 are shown in FIG. 52. The workpiece 2 is slid into the position shown by the machine transfer mechanism; the workpiece 2 is laterally guided by rails 204, 206, 208 and 210, and prevented from oversliding by end stop 212. Both the guides 204-210 and platform 182 are discontinuous and slots 214 permit vertical passage of the arms 94 of the P-buckets 70 and the arms 100 of the W-buckets 72, which are shown in superimposed view in FIG. 52, without interference.

A schematic vertical section of the lowerator pallet unloader 192 is shown in FIG. 51. This mechanism is again substantially identical with the reversible pallet loader unloader 14 shown in FIG. 6, except that in this case the lowerator pallet unloader sprockets 50 and 56 rotate only in a counterclockwise direction and the movable empty pallet entry gate 122 and the movable full pallet exit gate 148 are both deleted.

The operating sequences at the three interface stations of the lowerator pallet unloader 192 are the same as those described for the relevant stations of the elevator pallet loader unloader 14. The sequence for the unloading and lifting of pallets 4 on the fixed gate 166 is the same as described in FIGS. 34-38, except that the loaded pallets enter from track 190 rather than from track 18. Similarly, the sequence for the discharge of empty pallets 4 at the movable gate 142 is the same as that described in connection with FIGS. 39-43 except that the pallets roll away on track 194 instead of on track 24. Finally, the sequence for the disposition of workpieces 2 on the platform 196 is the same as described in connection with FIGS. 44-48 except that the roll conveyor 10 is replaced with the platform 196. This platform 196 is of substantially the same configuration as platform 182 (FIG. 52) having clearance slots for the free vertical passage of P-buckets 70 and W-buckets 72.

It will be noted that the empty pallet entry gate 122 has a definite repetitive sequence (FIGS. 24-28) related to the buckets on the chain and that this sequence repeats for every four modules (two bucket pitches) of chain travel. It, therefore, is possible to actuate the gate 122 with a mechanism driven from the same drive as the drive which drives the sprockets 50, and the mechanism of FIG. 13 is deleted. If the sprockets 50 have a pitch circumference equal to four modules of chain travel, then the shaft 46 makes one revolution per sequence cycle of the gate 122. An illustrative mechanism to actuate the gate 122 mechanically is shown in FIG. 53. It will be understood that this mechanism operates in a substantially vertical plane mounted on one side or the other of the elevator pallet loader 184, and that the sprockets 50 have a pitch circumference of four modules.

The drive shaft 46 extends out beyond a side-plate 40 and has mounted on it a crank arm 220. A link 222 is connected to the crank arm 220 by a pivot pin 224, which is displaced from shaft 46. The other end of link 222 is connected by pivot pin 226 to an idler link 228. This idler link is pivot mounted on the sideframe 40 through a stationary pivot pin 230. A virtual link 232, therefore, exists between fixed pin 230 and pin 226.

The idler link 228 in turn is pivot connected to a link 234 through a pivot pin 236, and a second virtual link 238, moving with a fixed angular relationship to link 232, exists between pins 230 and 236. The other end of link 234 is pivot connected to drive arm 240 through pin 242, and the drive arm 240 is mounted on and controls the angular position of shaft 130, on which is mounted the empty pallet input gate 122.

It can be seen that this linkage assembly is two four bar linkages operating in series; with the first four bar linkage comprised of crank 220, link 222, link 232, and the base link which is the fixed distance between shaft 46 and pin 230; and the second four bar linkage which is comprised of link 238, link 234, arm 240, and the base link which is the fixed distance between shaft 130 and pin 230.

The first four bar linkage is driven by the rotation of crank 220, and its output is an oscillation of link 232 about pin 230; this exact angular motion of link 232 is duplicated by link 238 and is the input motion of the second four bar linkage, whose output motion is the required oscillation of the arm 240 and gate 122. The exact linkage proportions, lengths and angular relationships can be determined by geometrical scale layouts, using conventional design techniques.

The linkage position shown in FIG. 53 corresponds to the extended position of gate 122 in FIG. 24 and the bucket positions in FIG. 24 correspond with the angular position of sprocket shaft 46 in FIG. 53. It can be seen (FIG. 53) that as the shaft 46 rotates 90° clockwise corresponding to one module of chain movement, the crank pin 224 reaches position 224a, at which point links 232, 238, arm 240, and gate 122 are again in the position shown in FIGS. 53 and 24, but the chain has moved one module upward (FIG. 25); furthermore, during this 90° rotation of shaft 46, the crank 224 goes "over center", resulting in relatively little movement of link 232, and the resultant small oscillation of link 238, which is also very near an "over center" condition with respect to link 234, causes a still smaller oscillation of arm 240 and gate 122 and the gate 122 is substantially stationary (FIG. 24 to FIG. 25) during this interval of chain movement as desired.

During the next 90° of movement of shaft 46, the crank pin 224 moves from position 224a to 224b, corresponding to the conditions shown in FIG. 26. This movement creates a large counterclockwise rotation of link 232 and link 238 about pin 230 and a large counterclockwise rotation of arm 240 and gate 122, retracting the gate as shown in FIG. 26.

As the shaft 46 rotates through the next 90°, corresponding to one additional module of chain movement, the crank pin 224 moves from position 224b to position 224c and the links 232, 238, arm 240, and gate 122 rotate slightly more counterclockwise but return to substantially the same position they had with crankpin 224 in position 224b; this is due to the crank arm 220 going over center again. The conditions of FIG. 27 are, therefore, achieved as required with gate 122 still retracted.

As the shaft 46 rotates through the final 90° of a cycle, the crank pin 224 moves from position 224c to its starting position 224 corresponding to the conditions of FIG. 28. This movement creates a large clockwise rotation of link 232 and link 236 about pin 230 and a large clockwise rotation of arm 240 and gate 122 re-extending the gate, as required and completing the cycle.

It will also be noted that the empty pallet exit gate 142 has a definite repetitive sequence (FIGS. 39-43) related to the buckets on the chain and that this sequence repeats for every four modules of chain movement. Therefore, it is also possible to actuate the gate 142 by a slaved mechanism from sprocket shaft 46 and deleting the cylinder mechanism of FIG. 43. An illustrative mechanism to accomplish the required movement of the gate 142 is shown in FIG. 54.

The sprocket shaft 46, again mounting sprockets 50 which have a pitch circumference equal to four modules of chain movement, has mounted to it a crank arm 250 which drives a link 252 through a crank pin 254. The other end of link 252 is connected by pin 256 to an idler link 258 which is pivotally mounted to the sideplate 40 through pin 260. A virtual link 262 exists between pin 260 and pin 256 and constitutes the output link 262 of a first four bar linkage comprised of an input link which is crank 250, link 252, and a base link which is the fixed distance between shaft 46 and pin 260.

The idler link 258 in turn is connected to a link 264 through a pin 266; the other end of link 264 is connected by pin 268 to a drive arm 270 mounted on shaft 144 which mounts the gate 142. It can be seen that a virtual link 272 exists between pins 266 and 260 on link 258 which has a fixed angular relationship to the link 262. This link 272 is the driving link of a second four bar linkage comprised of output arm 270, the link 264 and the base link which is the fixed distance between shaft 144 and pin 260.

As the arm 250 on shaft 46 rotates counterclockwise through the four 90° increments corresponding to the four stages of sequence of gate 142 (FIGS. 39-43), it can be seen that the linkage generates the required gate 142 movement. The position of the linkage in FIG. 54 corresponds to position of the gate and buckets in FIGS. 39 and 43. During the first 90° of rotation of shaft 46, the pin 254 reaches position 254a causing the gate 142 to reach its retracted position, FIG. 40. During the second 90° of rotation of shaft 46, the pin 254 moves from position 254a to 254b, causing the gate to remain retracted, but ready to start moving into the extended position shown in FIG. 41. During the third 90° of rotation of shaft 46, the pin 254 moves from position 254b to position 254c causing the gate 142 to reextend, and the gate 142 reaches its extended position in time to accept the pallet 4 being deposited on it by P-bucket 70, FIG. 41. Finally, as pin 254 is moved from position 254c back to its starting position 254, the gate 142 effectively dwells due to the over center condition of arm 250, and the near over center condition of link 272 with respect to link 264.

The linkages of FIGS. 53 and 54 each require that their input shaft make one revolution for each cycle. This is most conveniently accomplished by having the sprockets 50 have a pitch circumference of four modules and mounting the crank 220 or 250 directly on the shaft 46. In some designs, this is not possible, and the pitch circumference of sprockets 50 must have a pitch circumference larger or smaller than four modules. In such cases, an auxiliary shaft or countershaft may be journalled in the elevator frames 40 and driven from the shaft 46 through gears or sprockets and a chain with a ratio such that the countershaft makes exactly one revolution for each four modules of travel of chain 66. The cranks 220 and/or 250 are then mounted on such a countershaft.

The linkage shown in FIG. 53 may be directly mounted on the elevator pallet loader 184 as shown in FIG. 50. It may also be used with the elevator pallet loader unloader 14 shown in FIG. 6, but it must incorporate a lockout feature to keep the gate 122 retracted when the mechanism is operating in the pallet unloading mode. This lockout feature may be a cylinder in place of a link, such as link 234 or a clutch between arm 240 and shaft 130 or a clutch between shaft 46 and crank 220.

Similarly, the linkage shown in FIG. 54 may be directly mounted on the lowerator pallet unloader 192 as shown in FIG. 51; it may also be used with the elevator pallet loader-unloader 14 shown in FIG. 4, but it too must incorporate a lockout feature to keep the gate 142 retracted when the mechanism is operating in the pallet loading mode. This lockout feature can be as described for the linkage of FIG. 53.

The linkages shown in FIGS. 53 and 54 are examples which are particularly adapted to the present system. Other mechanically operated gate sequencing mechanisms may be employed. A suitable cam mounted on shaft 46, or on an equivalent countershaft making one revolution per cycle and actuating the shaft 130 (or 144) through a cam follower is also usable. Another technique requires that the gates (122 or 142) be spring biased towards the extended position and that cams on the chain or buckets force the gates open and against their spring bias at appropriate points in the cycle. All of these mechanical gate actuation techniques have as their objective the elimination of the cylinder, valves, limit switches and controls required with the gate actuation mechanism shown in FIG. 13.

In all of the mechanisms and sequencing illustrations presented, it is clear that the workpiece carrying buckets or W-buckets 72 are able to pass by empty pallets without interference and this has been accomplished by having the space between the arms 100 wider than the width of the pallet 4 (FIGS. 14, 17). This is a very desirable technique but is only usable with workpieces having a large ratio of length to width such as cylinder heads, camshafts and crankshafts for internal combustion engines. This technique becomes more difficult as the length width ratio of the workpiece approaches unity and a method of handling workpieces of this type is shown in FIG. 55.

Referring to FIG. 55, a workpiece 280, having a length width ratio close to unity is shown nested in a pallet 282. Superimposed on this composite view is shown a revised W-bucket comprised of hanger plates 96, spacer bar 98, and revised cantilever arms 286 adapted to support and locate the workpiece 280. Also, superimposed on this composite view is a revised P-bucket comprised of hanger plates 90, spacer bar 92 and revised cantilever arms 290, which are adapted to support and locate the pallet 282. It will be noted that the P-bucket arms 290 are outboard of the W-bucket arms 286 which is the inverse of the previous situation (FIG. 17). It will further be noted that the pallet has incorporated into it slots 292 through which the P-bucket arms 286 may pass as is required during actual pallet loading and unloading (FIGS. 29-33 and 34-38). The roller track and gates may support the pallet 282 along the bands defined by the dimension lines 294, or, with a still wider pallet, on bands outboard of the area on which the pallet is supported by the P-bucket arms 290. The arrangement shown in FIG. 55 also requires slots in the roller conveyor 10 or platforms 182 and 186 to permit passage of arms 286 and 290. In some cases, individual slots for each arm, totalling four, are more appropriate than only two slots, each of which permits passage of two different arms.

Both interrelationships, that shown in FIG. 55 and that shown in FIG. 17, are equally usable. The workpiece configuration will indicate the optimum choice.

Figure 56:
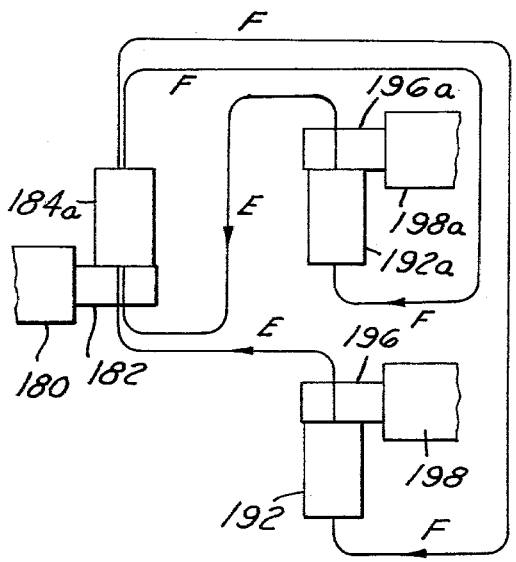
FIG. 56, a schematic plan view of a system using a single elevator pallet loader and multiple elevator pallet unloaders.

FIG. 56 illustrates an application in which the elevator pallet loader 184a and two lowerator pallet unloaders 192 and 192a are employed to divide the workpiece flow from a single processing machine 180 to two parallel downstream processing machines 198 and 198a. The overall system is comparable to that shown in FIG. 49, except that the elevator pallet loader 184a is modified through the addition of a second empty pallet input gate 122 above or below the existing empty pallet input gate 122 and the addition of a second full pallet exit gate 200 above or below the existing full pallet exit gate 200, with one of the full pallet exit gates 200 movable so that it can be retracted when the other gate is in use. The tracks interconnecting the pallet loader 184a with the two pallet unloaders are shown in simplified schematic in which the direction of pallet flow (descending slope) are shown by superimposed arrows and the condition of the pallets rolling thereon indicated by E for empty and F for full.

It can be seen from FIG. 50 that additional empty pallet entry gates 122 can be added at even module spacings, and that as one gate or the other is selected to deliver empty pallets to the P-buckets, that these multiple gates act as controllable switches, to select empty pallets from the gueues arriving from one unloader or the other.

Similarly, it can be seen from FIG. 50 that additional multiple full pallet exit gates 200 may be added at even modules, but only the lowest one may be fixed while those above it must be retractable such as at exit gate 148 (FIG. 6).

Figure 57:
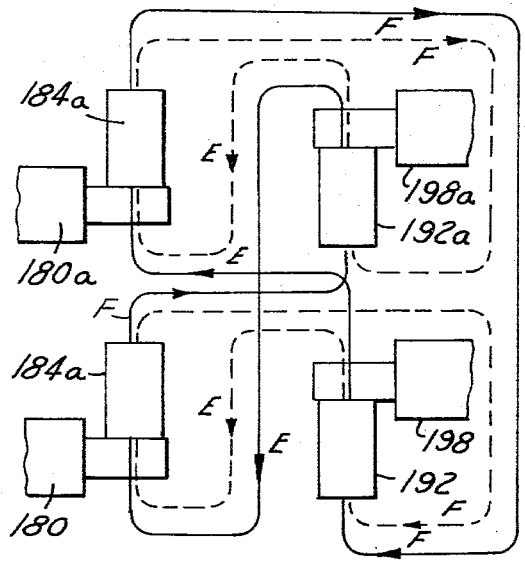
FIG. 57, a schematic plan view of a system for cross-feeding between lines.

The technique of multiple exit and entry positions on a single elevator or lowerator can be extended further to accomplish crossfeeding between multiple parallel processing lines; this is shown in FIG. 57. Considering only the lower two machines 180 and 198, the tracks used for normal on-line flow are shown in dotted line and correspond with the flow pattern shown in FIG. 49. The upper pair of machines 180a and 198a also have an on-line flow on tracks indicated by dotted lines which also correspond with the flow pattern of FIG. 49. Referring to FIG. 57, the tracks shown in solid lines are used to provide crossflow of workpieces such as from machine 180 to machine 198a or from machine 180a to machine 198, each of which requires supplying loaded pallets and returning empty pallets.

It can be seen that additional full pallet entry gates 166 must be added to the lowerator pallet unloaders 192 and 192a, and that these additional gates must be retractable; and that additionally empty pallet exit gates 142a must be added to these same mechanisms. This is accomplished analogously to the gates added to the loaders 184a in FIG. 57.

The addition of multiple gates to either the loaders 184a or unloaders 192a must comply with an easily seen set of requirements; only one gate of any given type may be operative during any one cycle, while others of its type are retracted; and the sequence relevant to such an operating gate is as was described in connection with that gate in the sequence diagrams, FIGS. 19-48.

The several embodiments of the invention described above all employed two types of carriers or buckets which were identical in number and alternately spaced around the chain peripheries.

Figure 58:
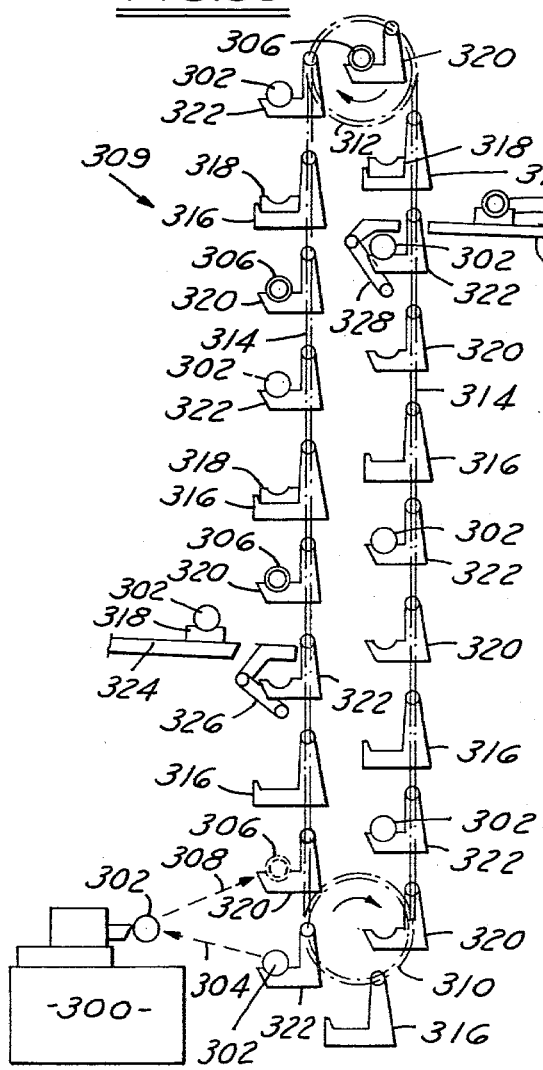
FIG. 58, a vertical section through an elevator pallet loader unloader using three different types of buckets.

An even more flexible arrangement, which employs three types of buckets, is shown in FIG. 58. This embodiment, which satisfies the needs of single station machines, or multiple station transfer machines having a common or adjacent load and unload stations, is capable of accepting incoming palletized workpieces, unloading the pallets, delivering the incoming workpieces to the machine, accepting the completed workpieces from the machine, reloading the completed workpieces into the temporarily empty pallets, and discharging the pallets loaded with completed workpieces at a higher level than the level at which the incoming pallets were received.

Referring to FIG. 58, a processing machine 300 performs certain operations on a workpiece 302 while it is located and supported within the machine. An automatic loader and unloader, such as a mechanical hand, is capable of transferring a workpiece 302 from a predetermined position into the machine work station as shown by arrow 304, and is also capable of transferring a completed workpiece 306 (a different number is used to distinguish incoming workpieces 302 from completed workpieces 306) from the machine work station to another predetermined position, as shown by arrow 308.

A pallet loader-unloader elevator 309 is positioned adjacent to machine 300 and is comprised of a suitable frame supporting two sets of sprockets, a lower pair 310 and an upper pair 312, which are journalled therein and driven by a suitable drive as previously described. Two spaced sets of chains 314 operate between these sprockets and pivotally support a series of carriers or buckets at approximately equal spacing. The chains and buckets are guided in channels on the frame again as previously described.

Three types of buckets are sequentially positioned on the chain. P-buckets 316 are configured to support and locate a pallet 318; W0-buckets 320 are configured to support and locate a workpiece 306 which has been completed by the associated machine 300, and further distinguished by a concentric pair of circles; and W1-buckets 322 which are configured to locate and support an incoming workpiece 302, which has yet to be operated on by the associated machine 300.

There are three interface locations associated with the elevator 309; pallets 318 carrying incoming workpieces 302, arrive on a low level track 324, from which they are released at the appropriate time by an escapement to roll onto a movable input gate 326 which can be extended or retracted. Pallets 318 loaded with completed workpieces 306 are removed from the elevator 309 by a movable exit gate 328 which can be extended or retracted and is provided with a temporary holding stop (FIG. 16); when released, the pallets roll away on a high level exit track 330. The third interface position on the elevator 309 occurs at the position of machine 300, where a machine loader loads a completed workpiece 306 into a W0-bucket 320 and removes an incoming workpiece 302 from an adjacent W1-bucket 322 and loads it into the machine 300.

The interference and clearance conditions are the same as described in relation to the embodiment of FIG. 6. All three types of buckets 316, 320 and 322, when empty, can move past the extended gates 326 and 328 without interference. Both types of workpiece buckets 320 and 322, when empty, can move past a pallet 318 on either extended gate 328 and 330, and all buckets 316, 320 and 322, empty or full, can move past either retracted gate 320 and 328 without intereference.

All buckets are substantially equally spaced, but the system will operate even with considerable non-equality of spacing limited only by bucket-to-bucket interference and the space required for gate retraction and pallet exit and entry space. A total index cycle requires a total chain movement equal to the distance or pitch between two identical buckets, which is equal to three bucket pitches. If the distance between any two adjacent buckets is defined as two modules, as before, then the index distance is six modules. The movement of the chain 314 through a distance of one module is defined as a stage, and six stages equal one index cycle. The chain may move at constant velocity through an index cycle but the preferred arrangement is to use a mechanism as shown at 55 in FIG. 6 to produce an accelerated-decelerated motion whose stroke is equal to one module, as before, and a total cycle consists of six acceleration-deceleration steps. The sprockets 310 and 312 always rotate clockwise with the left-hand chain 314 moving upward and the right-hand chain 314 moving downward.

At the input gate 326, the cycle begins when the escapement on track 324 releases a pallet 318 loaded with an incoming workpiece 302 onto the gate 326. At that time, the buckets are positioned such that a W0-bucket 320 carrying a completed workpiece 306 is positioned one module above the input gate 326, and an empty W1-bucket 322 is positioned one module below the input gate 326. With the loaded pallet 318 on the input gate 326 the chain index cycle begins. After the first stage of index, the empty W1-bucket 322 (moving upward) contacts the workpiece 302 in pallet 318 on gate 326. After the second stage of movement, the W1-bucket 322 has lifted the workpiece 302 one module above the input gate 326, leaving a now empty pallet 318 still supported by input gate 326; an empty P-bucket 316 is located one module below this position. After the third stage of movement, the P-bucket 316 contacts the empty pallet 318 on input gate 326 and after the fourth stage of movement, the P-bucket 316 has lifted the empty pallet 318 one module above the now empty input gate 326, and a W0-bucket 320 carrying a completed workpiece 306 is located one module below input gate 326. At this time, the input gate 326 is retracted, or, if it is mechanically operated, it can begin retracting during the fourth stage of chain movement. At the end of the fifth stage of movement, the input gate 326 is fully retracted and the W0-bucket 320 carrying workpiece 306 is in its position. At the end of the sixth stage of movement, the W0-bucket 320 carrying workpiece 306 is one module above the position of gate 326, and the gate 326 is re-extended completing the cycle. If the gate 326 is mechanically actuated, it can begin re-extending as soon as the W0-pallet 320 carrying workpiece 306 is clear, to be fully re-extended at the completion of the chain index movement. It will be noted that all buckets above the index gate 326 are loaded with the items they are designed to support. These are carried up and over the upper sprockets 312 to descend to the exit gate 328.

At the exit gate 328, the cycle begins with the empty gate 328 extended, the previously loaded pallet having rolled away on track 330. At this time, a W1-bucket 322 carrying a workpiece 302 is positioned one module below the gate 328, and a P-bucket 316 carrying a pallet 318 is positioned one module above the gate 328. At the end of the first stage of chain movement (which is downward past gate 326), the P-bucket 316 carrying a pallet 318 has lowered the pallet 318 onto the exit gate 328, and after the second stage of chain movement, the now empty P-bucket 316 is located one module below the gate 328 on which the empty pallet 318 is now supported and temporarily held from rolling away by the stop on the gate. At this time, a W0-bucket 320 carrying a workpiece 306 is located one module above the gate 328. After the third stage of index, the W0-bucket 320 has deposited the workpiece 306 into the pallet 318 waiting on gate 328. After the fourth stage of movement, the W0-bucket 320, now empty, is positioned one module below the gate 328, and during this fourth stage of movement, as soon as the W0-bucket was sufficiently clear of the pallet 318 and workpiece 306 on gate 328, the pallet 318 carrying workpiece 306 is released to roll away. A slight pause at the end of the fourth stage might be required to insure that the pallet 318 has fully exited on track 330. After the pallet 318 has cleared the station, the exit gate 328 is retracted, or if the gate is mechanically operated, it can retract during the fifth stage of chain travel. At the end of the fifth stage of chain movement, a W1-bucket 322 carrying a workpiece 302 is in the position of the gate 328 (were it extended) which is fully retracted, and, at the end of the sixth stage of chain movement, this W1-bucket 322 carrying a workpiece 302 is one module below the position of gate 328. The gate 328 is now re-extended, or if the gate 328 is mechanically actuated, it can begin to re-extend as soon as the W1-bucket 322 has cleared and the re-extension need not be complete until shortly before the following P-bucket 316 deposit a pallet 318 thereon. This completes the index cycle at the exit gate 328. It will be noted that of all the buckets passing this gate, only the W1-buckets 322 carrying workpieces 302 are loaded, the W0-buckets 320 and P-buckets 316 are empty having been emptied at the exit gate 328.

At the interface station between the elevator 309 and the machine 300, two optional sequences are available. In the first option, the mechanical loader which is part of the machine 300 removes a completed workpiece 306 from the work station of machine 300 and loads it into an empty W0-bucket 320, as shown by arrow 308. The loader then moves downward to pick up an incoming workpiece 302 from the adjacent W1-bucket 322, removes it from said bucket and delivers it to the work station of machine 300 as shown by arrow 304. This requires a complex movement pattern for the machine loader but requires no elevator movement.

With the second option, the loader on machine 300 again removes a completed workpiece 306 from the work station of machine 300 and loads it into an empty W0-bucket 320, as shown by arrow 308. The loader or mechanical hand then waits or retracts slightly while the chain moves through two stages of movement, which is equal to one bucket pitch. This brings a W1-bucket 322 carrying a workpiece 302 into the same position, recently vacated, that the workpiece 306 had been loaded into. The loader removes the workpiece 302 from W1-bucket 322 and delivers it to the work station of machine 300 moving opposite to the direction of arrow 308. The advantage of the second option is that the loader need only reciprocate along the direction of arrow 308, while the disadvantage is the increased time added to the unload-reload cycle caused by the addition of the time for two stages of chain movement.

The gates 326 and 328 may be actuated by cylinders as in FIG. 13, or by mechanical systems comparable to those shown in FIGS. 53 and 54 and as otherwise previously described. While the W0-buckets 320 and the W1-buckets 322 are always functionally different, they may be structurally identical, when the work performed by machine 300 does not affect the surfaces on which the workpieces 302 and 306 are located and supported by their respective buckets.

As described earlier, the stages at the interface stations need not be concurrent. Stage four can be occurring at gate 326, while, say, stage one is occuring at gate 328. This yields the maximum flexibility to the positioning of the gates which may be located at any integral module spacing from each other.

Figure 59:
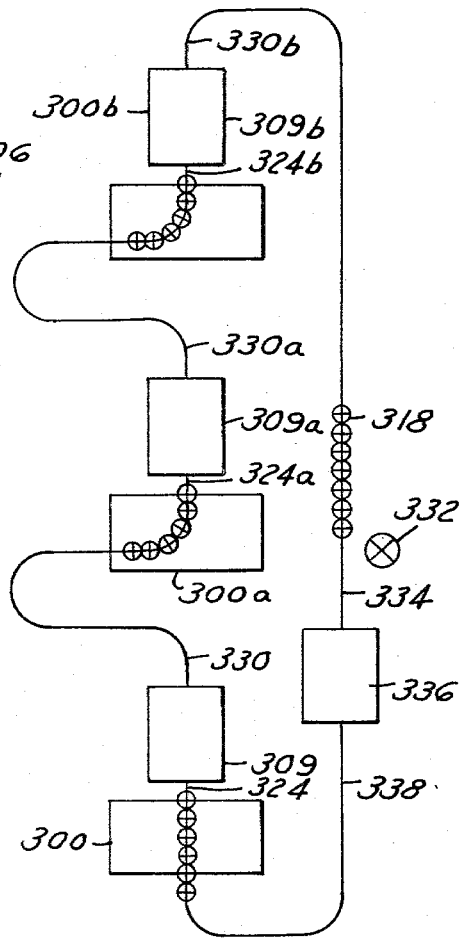
FIG. 59, a schematic plan view of a processing line using elevators shown in FIG. 58.

An illustrative production line utilizing elevators 309 is shown in FIG. 59. Three processing machines, 300, 300a, and 300b perform sequential operations on the workpiece 302, 306; each has associated with it an elevator 309, 309a, and 309b. An operator 332 manually loads incoming workpieces 302 into pallets 318 on a low level track 334 on which they roll down into a simple elevator 336, described in copending application, Ser. No. 908,941, which elevates the loaded pallets 318 and discharges them on a high level track 338, on which they roll down to the end of a queue whose beginning is at the low level track 324 entry into elevator 309. Here the outgoing workpieces 306 are interchanged for the incoming workpieces 302 on the same pallets 318. The reloaded pallets 318 are discharged on high level track 330 from which they roll to the low level track 324a on the next elevator 309a, forming a queue thereon. The reloading procedure is repeated and the pallets 318, now reloaded with workpieces completed by machine 300a, proceed on high level track to low level track 324b at the entry to elevator 309b. The pallets 318 are again reloaded to be discharge on high level track 330b with workpieces 306b which have been completed by all three machines 300, 300a, and 300b. These roll down to low level track 334, forming a queue thereon, to be released by an escapement controlled by the operator 332 as he removes the totally complete workpieces 306b and replaces them with incoming workpieces 302.

It can be seen that this technique can be expanded to more machines than the three illustrated in FIG. 59. It can further be seen that, through the addition of multiple input gates and multiple output gates on the elevators 309 (or track switches as illustrated in my copending application, Ser. No. 908,941), it is possible to divide flow to multiple parallel machines, recombine flow from multiple parallel machines, or crossfeed between multiple parallel lines.

In most cases, it is desirable and advantageous to have the various embodiments of this invention discharge the outgoing pallets at a higher level than the incoming pellets whether loading or unloading is being accomplished. In some application, however, it may be desired that the discharged pallets exit at the same level or a lower level than the incoming level. It can be seen that there is nothing in the concept or construction of these embodiments to prevent this. It is only necessary to raise the pallet entry gates and/or lower the pallet exit gates as required to meet the entry and exit levels determined by the external trackage system.

While each of the embodiments shows multiple P-buckets 70 and multiple W-buckets 72, it can be seen that each will operate even if there is only one bucket of each type mounted on the chains, such as, for example, (FIG. 50) the P-bucket 70 one module below the empty pallet input gate 122 and the W-bucket 72 one module below the platform 182. With only one bucket of each type mounted between the chain loops, a complete load cycle requires a movement of the chain 66 equal to their length, and, at the end of a cycle, the buckets mounted thereon will have returned to their position at the start of a cycle. During their total movement around the chain loop, the single P-bucket 70 picks up an empty pallet 4 from the input gate 122, carries it to the exit gate 200 and deposits it thereon; the following W-bucket 72 picks up a workpiece 2 from the platfrom 182, carries it to the empty pallet 4 now waiting at the exit gate 200 and loads the pallet 4; and both buckets continue on to their start position, completing the cycle. In these single bucket applications, the chain 66 will generally be driven at constant speed around the loop.

It can be seen that this single bucket of each type technique is equally applicable to the embodiments of FIGS. 6, 51 and 58.

In essence, the technique of mounting multiple types of buckets on chain elevators, sequentially spaced thereon, makes it possible for this mechanism to provide a variety of useful functions.

I claim:

1. In an article carrier system, in which articles are transferred from one point to another, while supported by pallets, means for loading said articles into said pallets comprising:
    A. an endless conveyor disposed in a generally vertical direction, and having a first portion moving in a generally upward direction and a second portion moving in a generally downward direction,
    B. drive means for moving said endless conveyor in said given directions,
    C. an article support member positioned adjacent said first portion of said conveyor,
    D. a first support member adapted to support a pallet and positioned adjacent said first portion of said conveyor,
    E. a second support member adapted to support a pallet and positioned adjacent said second portion of said conveyor,
    F. one or more pallet conveying members of one type spaced along said conveyor,
    G. one or more article conveying members of a second type spaced along said conveyor in alternating positions with said pallet conveying members,
    H. the conveying members and the support members being interdigitally related such that said empty conveying members can pass by all said empty support members and said article conveying members are adapted to pick up articles from said article support member and said article conveying members are adapted to pass by a pallet supported on said second support member,
whereby said article conveying members pick up articles at said article support member and said pallet conveying members pick up empty pallets at said first supporting member, and whereby a pallet conveying member deposits an empty pallet on said second support member and the following article conveying member deposits an article into said pallet on said second support member, thereby loading said pallet.

2. A means for loading as in claim 1 in which said first support member is movably mounted adjacent said endless conveyor and can take two positions: a first position in which said first support member supports a pallet in a position to be picked up by one of said pallet conveying members and a second position in which said first support member is clear of the path of article conveying members which are carrying articles.

3. A means for loading as in claim 2 in which said first support member is moved between said first and said second positions by a fluid actuated cylinder.

4. A means for loading as in claim 2 in which said first support member is moved between said first and said second positions by a mechanical drive train actuated by said drive means.

5. A means for loading as in claim 4 in which said mechanical drive train is comprised of a first four bar linkage driven by an eccentric crank, and in turn drives a second four bar linkage which actuates said first support member.

6. A means for loading as in claim 1 in which said drive means for said endless conveyor is designed to index said endless conveyor through a mechanically generated acceleration-deceleration movement having a predetermined stroke of one module and the distance between any two adjacent conveying members of the same type is an integral number of said modules.

7. A means for loading as in claim 6 in which the distance between any two adjacent conveying members of the same type is four said modules, and the distance between any two adjacent conveying members of different types is two said modules.

8. In an article carrier system, in which articles are transferred from one point to another, while supported by pallets, means for unloading said articles from said pallets comprising:
   A. an endless conveyor disposed in a generally vertical direction and having a first portion moving in a generally downward direction and a second portion moving in a generally upward direction,
   B. drive means for moving said endless conveyor in said given directions,
   C. an article support member positioned adjacent said first portion of said conveyor,
   D. a first support member adapted to support a pallet and positioned adjacent said first portion of said conveyor,
   E. a second support member adapted to support a pallet and positioned adjacent said second portion of said conveyor,
   F. one or more pallet conveying members of one type spaced along said conveyor,
   G. one or more article conveying members of a second type spaced along said conveyor in alternating positions with said pallet conveying members,
   H. the conveying members and the support members being interdigitally related such that said empty conveying members can pass by all said empty support members and said article conveying members are adapted to deposit articles on said article support member and said article conveying members are adapted to pass by a pallet supported on said second support member,
whereby said article conveying members pick up said articles from pallets on said support member and the following pallet conveying members pick up empty pallets from said second support member, and said pallet conveying members deposit pallets on said first support member, and said article conveying members deposit said articles on said article support member, thereby unloading said pallets.

9. A means for unloading as in claim 8 in which said first support member is movably mounted adjacent said endless conveyor and can take two positions: a first position in which said firt support member supports a pallet in a position in which it is deposited by one of said pallet conveying members and a second position in which said first support member is clear of the path of article conveying members which are carrying articles.

10. A means for unloading as in claim 9 in which said first support member is moved between said first and said second positions by a fluid actuated cylinder.

11. A means for unloading as in claim 9 in which said first support member is moved between said first and said second positions by a mechanical drive train actuated by said drive means.

12. A means for unloading as in claim 11 in which said mechanical drive train is comprised of a first four bar linkage driven by an eccentric crank, and in turn drives a second four bar linkage which actuates said first support member.

13. A means for unloading as in claim 8 in which drive means for said endless conveyor is designed to index said endless conveyor through a mechanically generated acceleration-deceleration movement having a predetermined stroke of one module and the distance between any two adjacent conveying members of the same type is an integral number of said modules.

14. A means for unloading as in claim 13 in which the distance between any two adjacent conveying members of the same type is four said modules, and the distance between any two adjacent conveying members of different types is two said modules.

15. In an article carrier system in which articles are transferred to and from pallets and in which said articles are processed in an operation while not in said pallets, means for unloading unprocessed articles from said pallets and reloading processed articles into said pallets comprising:
   A. an endless conveyor disposed in a generally vertical direction, and having a first portion moving in a generally upward direction and a second portion moving in a generally downward direction,
   B. drive means for moving said endless conveyor in said given directions,
   C. one or more pallet conveying members of one type spaced along said conveyor,
   D. one or more first article conveying members of a second type spaced along said conveyor in a periodic sequence with said pallet conveying members, and adapted to carry said unprocessed articles,
   E. one or more second article conveying members of a third type spaced along said conveyor in a periodic sequence with said pallet conveying members and said first article conveying members, and adapted to carry said processed articles,
   F. a first support member adapted to support a pallet and positioned adjacent said first portion of said conveyor,
   G. a second support member adapted to support a pallet and positioned adjacent said second portion of said conveyor,
   H. station means adjacent said conveyor at which unprocessed articles are removed from said first article conveying members and processed articles are placed into said second article conveying members,
   I. the conveying members and the support members being interdigitally related such that empty conveying members can pass by all empty support members and all empty article conveying members are adapted to pass by pallets supported on said support members, whereby said first article conveying members pick up unprocessed articles from pallets supported on said first support member and following pallet conveying members pick up pallets supported on said first support member, and said pallet conveying members deposit pallets on said second support member and following said second article conveying members deposit processed articles into pallets on said second support member, and unprocessed articles are removed from said first article conveying members and processed articles are deposited into said second article conveying members at said station means, and thereby pallets loaded with unprocessed articles are unloaded and reloaded with processed articles.

16. A means for unloading and reloading pallets as in claim 15 in which said first support member is movably mounted adjacent said endless conveyor and can take two positions: a first position in which said first support member supports a pallet in a position to be picked up by one of said pallet conveying members, and a second position in which said first support member is clear of the path of article conveying members which are carrying articles.

17. A means for unloading and reloading pallets as in claim 15 in which said second support member is movably mounted adjacent said endless conveyor and can take two positions: a first position in which said second support member supports a pallet in a position in which it is deposited by one of said pallet conveying members and a second position in which said second support member is clear of the path of article conveying members which are carrying articles.

18. A means for unloading and reloading pallets as in claim 15 in which said drive means for said endless conveyor is designed to index said endless conveyor through a mechanically generated acceleration-deceleration movement having a predetermined stroke of one module and the distance between any two adjacent conveying members of the same type is an integral number of said modules.

* * * * *